US009727381B2

(12) United States Patent
Hatano

(10) Patent No.: US 9,727,381 B2
(45) Date of Patent: Aug. 8, 2017

(54) IMAGE FORMING APPARATUS AND RESOURCE MANAGEMENT METHOD

(71) Applicant: CANON KABUSHIKI KAISHA, Tokyo (JP)

(72) Inventor: Manami Hatano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 14/837,754

(22) Filed: Aug. 27, 2015

(65) Prior Publication Data

US 2016/0062801 A1 Mar. 3, 2016

(30) Foreign Application Priority Data

Sep. 1, 2014 (JP) ................................ 2014-177432

(51) Int. Cl.
*G06F 9/46* (2006.01)
*G06F 9/50* (2006.01)

(52) U.S. Cl.
CPC .................................. *G06F 9/5011* (2013.01)

(58) Field of Classification Search
None
See application file for complete search history.

(56) References Cited

U.S. PATENT DOCUMENTS 6,654,780 B1 * 11/2003 Eilert .................... G06F 9/5011 718/104
8,294,928 B2 * 10/2012 Okabe ................ H04N 1/00244 358/1.13
8,587,797 B2 * 11/2013 Kato ..................... G06F 3/1204 358/1.14
2013/0185712 A1 * 7/2013 Osada .................... G06F 9/445 717/174

FOREIGN PATENT DOCUMENTS

JP 8328884 A 12/1996
JP 2004362425 A 12/2004
JP 2010039689 A 2/2010

* cited by examiner

*Primary Examiner* — Kenneth Tang
(74) *Attorney, Agent, or Firm* — Carter, DeLuca, Farrell & Schmidt, LLP

(57) ABSTRACT

The upper limit value of a resource amount is set for a group introduced as a fragment bundle for a resource service. At the time of introducing a group, the amount of a resource used by an application belonging to the group can be transferred to management for each group.

10 Claims, 23 Drawing Sheets

110
APPLICATION A
111
APPLICATION B
112
APPLICATION C
100
IMAGE FORMING APPARATUS
130
NETWORK
101
INFORMATION PROCESSING APPARATUS

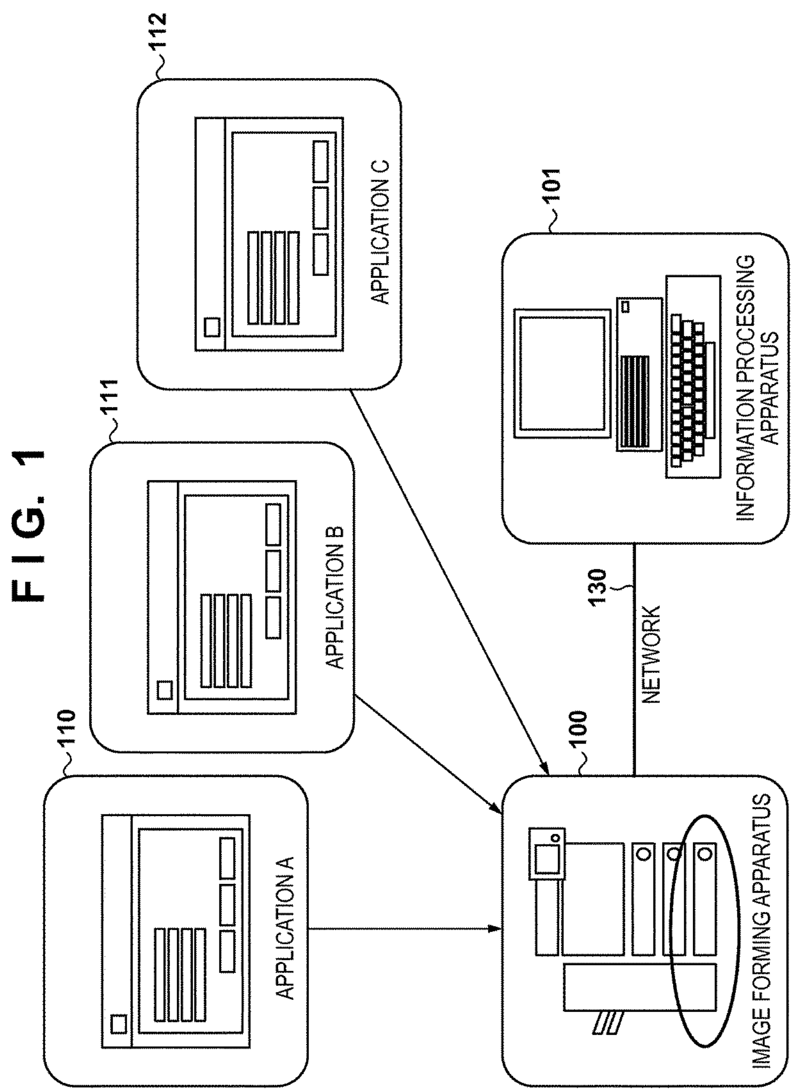
F I G. 1
112
APPLICATION C
111
APPLICATION B
110
APPLICATION A
101
INFORMATION PROCESSING APPARATUS
130
NETWORK
100
IMAGE FORMING APPARATUS 100
200
CORE UNIT
201
USER INTERFACE UNIT
202
STORAGE DEVICE
203
NETWORK INTERFACE UNIT
204
SCANNER UNIT
205
PRINTER UNIT
206
FINISHER UNIT
130
NETWORK

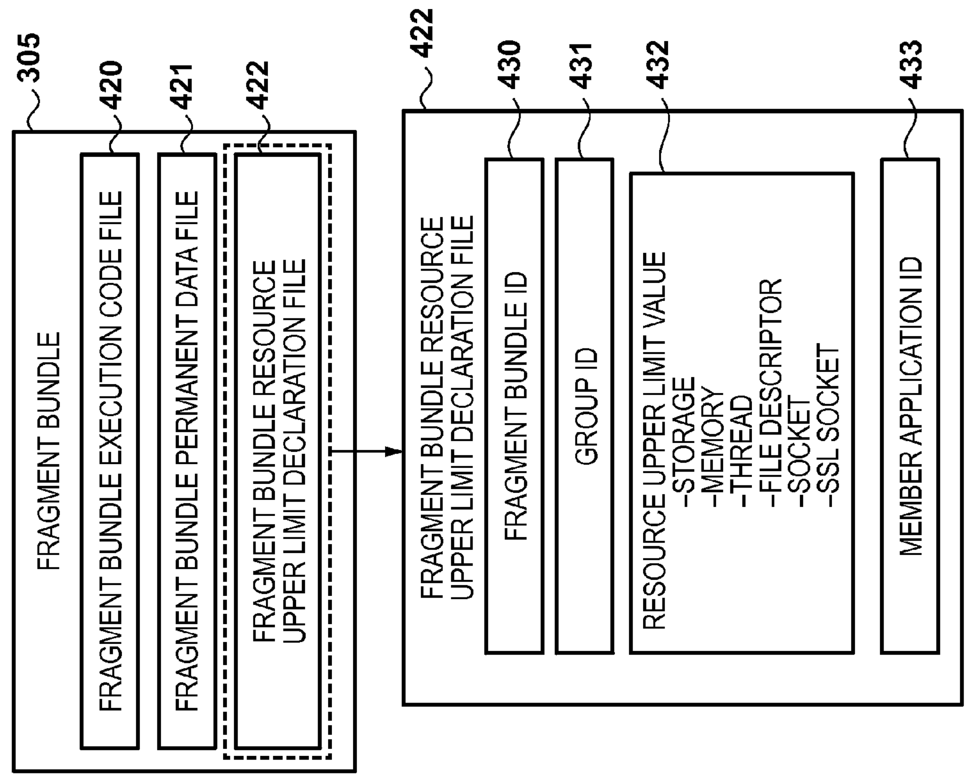
F I G. 4B
305
FRAGMENT BUNDLE
420
FRAGMENT BUNDLE EXECUTION CODE FILE
421
FRAGMENT BUNDLE PERMANENT DATA FILE
422
FRAGMENT BUNDLE RESOURCE UPPER LIMIT DECLARATION FILE
422
FRAGMENT BUNDLE RESOURCE UPPER LIMIT DECLARATION FILE
430
FRAGMENT BUNDLE ID
431
GROUP ID
432
RESOURCE UPPER LIMIT VALUE
-STORAGE
-MEMORY
-THREAD
-FILE DESCRIPTOR
-SOCKET
-SSL SOCKET
433
MEMBER APPLICATION ID

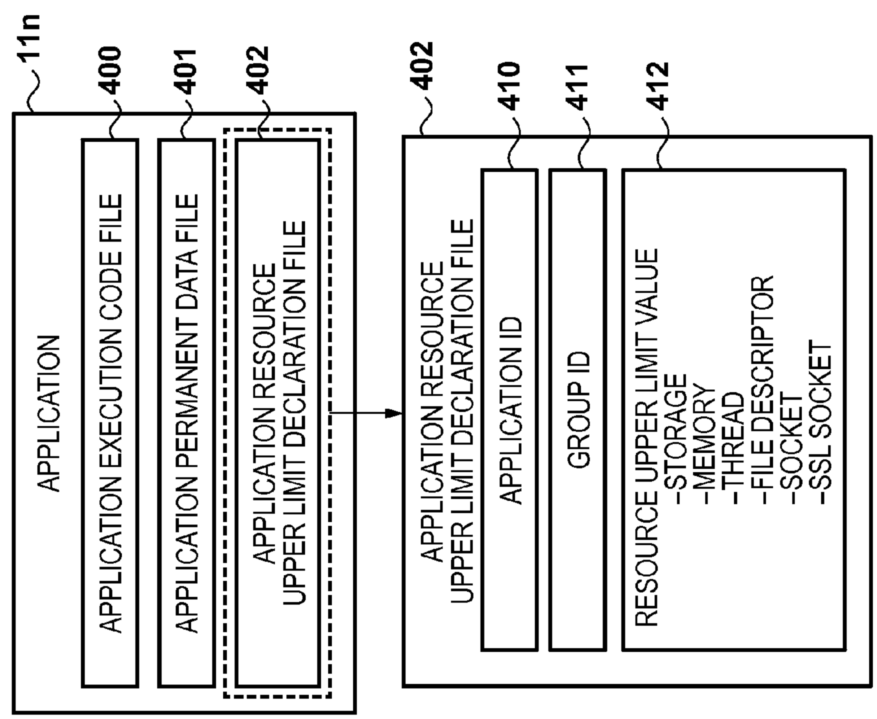
F I G. 4A
11n
APPLICATION
400
APPLICATION EXECUTION CODE FILE
401
APPLICATION PERMANENT DATA FILE
402
APPLICATION RESOURCE UPPER LIMIT DECLARATION FILE
402
APPLICATION RESOURCE UPPER LIMIT DECLARATION FILE
410
APPLICATION ID
411
GROUP ID
412
RESOURCE UPPER LIMIT VALUE
-STORAGE
-MEMORY
-THREAD
-FILE DESCRIPTOR
-SOCKET
-SSL SOCKET

FIG. 5A

APPLICATION MANAGEMENT — UPDATE DATE & TIME : 2014/05/12 14:00

| APPLICATION NAME | | UPDATE DATE & TIME | STATE | | | LICENSE |
|---|---|---|---|---|---|---|
| RESOURCE SERVICE | 1.0 | 2014/04/28 10:52 | START | STOP | UNINSTALL | UNNECESSARY |
| APPLICATION X | 1.3 | 2014/05/09 09:14 | START | STOP | UNINSTALL | NECESSARY |
| APPLICATION Y | 2.6 | 2014/04/30 11:28 | START | STOP | UNINSTALL | NECESSARY |
| APPLICATION ALPHA | 0.1 | 2014/05/12 07:10 | START | STOP | UNINSTALL | NECESSARY |
| APPLICATION BETA | 0.1 | 2014/05/12 07:14 | START | STOP | UNINSTALL | NECESSARY |
| APPLICATION GAMMA | 0.1 | 2014/05/12 07:19 | START | STOP | UNINSTALL | NECESSARY |

APPLICATION MANAGEMENT — UPDATE DATE & TIME : 2014/05/12 14:32

| APPLICATION NAME | | UPDATE DATE & TIME | STATE | | | LICENSE |
|---|---|---|---|---|---|---|
| RESOURCE SERVICE | 1.0 | 2014/04/28 10:52 | START | STOP | UNINSTALL | UNNECESSARY |
| └ APPLICATION ABC GROUP SETTING | 0.1 | 2014/05/12 14:20 | | STOP | UNINSTALL | UNNECESSARY |
| APPLICATION X | 1.3 | 2014/05/09 09:14 | START | STOP | UNINSTALL | NECESSARY |
| APPLICATION Y | 2.6 | 2014/04/30 11:28 | START | STOP | UNINSTALL | NECESSARY |
| APPLICATION ALPHA | 0.1 | 2014/05/12 14:20 | START | STOP | UNINSTALL | NECESSARY |
| APPLICATION BETA | 0.1 | 2014/05/12 14:20 | START | STOP | UNINSTALL | NECESSARY |
| APPLICATION GAMMA | 0.1 | 2014/05/12 14:20 | START | STOP | UNINSTALL | NECESSARY |

| FRAGMENT BUNDLE ID (601) | GROUP ID (602) | DETECTION TIME (603) | DELETION DETECTION TIME (604) | MANAGEMENT TARGET APPLICATION ID (605) | VALIDATION STATE (606) |
|---|---|---|---|---|---|
| FB01-22AC-3F95 | 9704-FC00-1032 | 2014/05/12 14:20 | (n/a) | A880-3021-0001-0100<br>A880-3021-0002-0100<br>A880-3021-0003-0104 | VALID |
| FB05-9C0A-8801 | 9704-F30E-020B | 2014/05/10 08:42 | (n/a) | A880-C10F-0002-0142<br>A880-C10F-0008-0133<br>A880-B902-003C-0401 | INVALID |
| FB01-A020-9C4D | 9704-E200-C827 | 2014/04/29 09:52 | 2014/04/30 18:06 | A880-C10F-0002-0142<br>A880-C10F-000F-0133<br>A880-C10F-0088-0302 | UNINSTALLED |
| ⋮ | ⋮ | ⋮ | ⋮ | ⋮ | ⋮ |

| APPLICATION ID (621) | GROUP ID (622) | VERSION (623) | RESOURCE UPPER LIMIT VALUE IN SINGLE MANAGEMENT (624) | BODY FILE SIZE (625) | GROUP MANAGEMENT STATE (626) |
|---|---|---|---|---|---|
| A880-3021-0001-0100 | 9704-FC00-1032 | 0.100 | Storage: 228,000,000 bytes<br>Memory: 2,000,000 bytes<br>Thread: 3<br>Socket: 5<br>SSL_Socket: 2 | 8,000,000 bytes | VALID |
| A880-3021-0002-0100 | 9704-FC00-1032 | 0.100 | Storage: 317,000,000 bytes<br>Memory: 3,000,000 bytes<br>Thread: 4<br>Socket: 2<br>SSL_Socket: 1 | 17,000,000 bytes | INVALID |
| A880-3021-0003-0104 | 9704-FC00-1032 | 0.104 | Storage: 185,300,000 bytes<br>Memory: 1,500,000 bytes<br>Thread: 2<br>Socket: 3<br>SSL_Socket: 2 | 3,300,000 bytes | VALID |
| .... | .... | .... | .... | .... | .... |

630

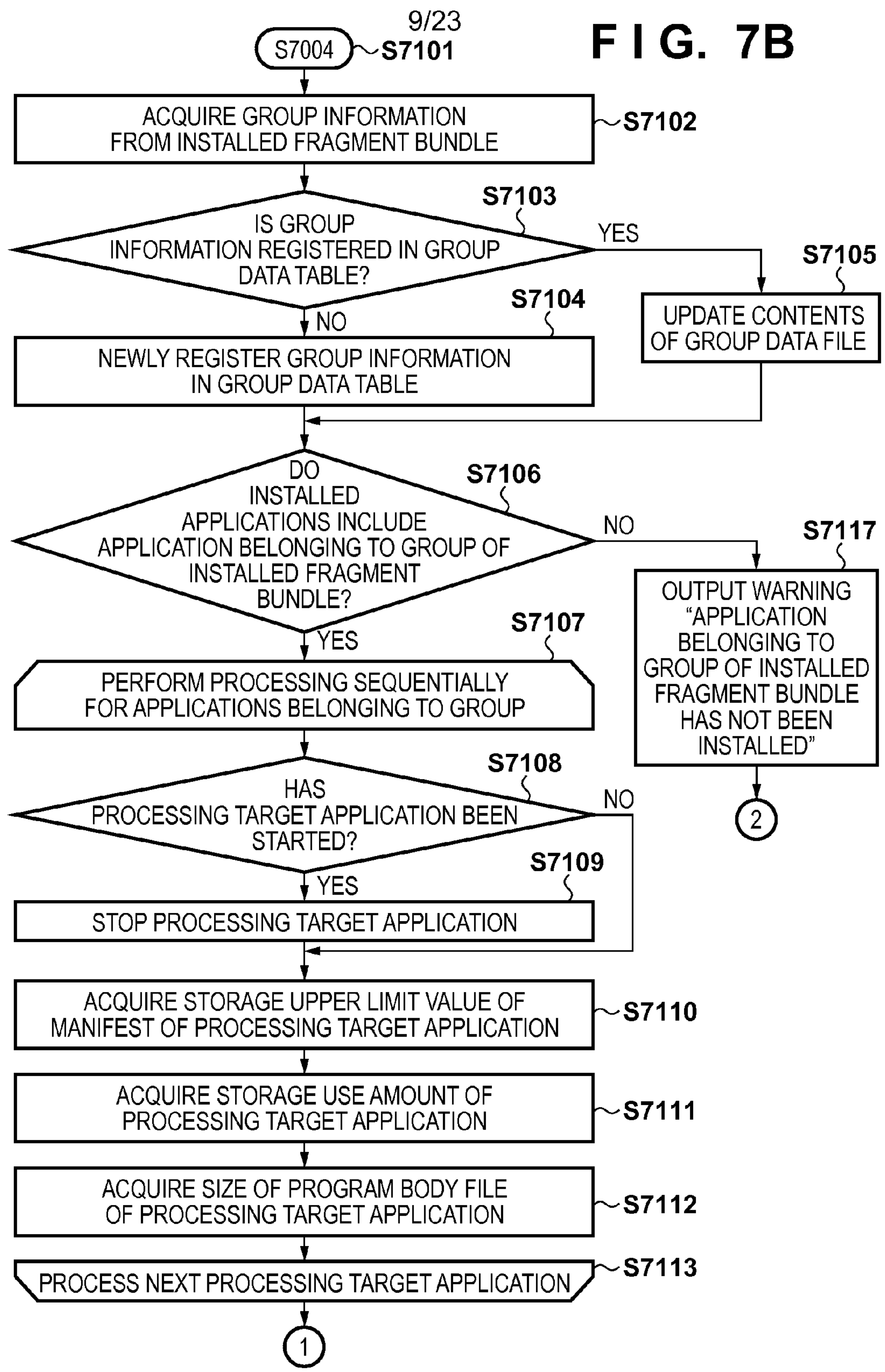
9/23
FIG. 7B
S7004
S7101
ACQUIRE GROUP INFORMATION FROM INSTALLED FRAGMENT BUNDLE
S7102
IS GROUP INFORMATION REGISTERED IN GROUP DATA TABLE?
S7103
YES
NO
S7105
UPDATE CONTENTS OF GROUP DATA FILE
S7104
NEWLY REGISTER GROUP INFORMATION IN GROUP DATA TABLE
DO INSTALLED APPLICATIONS INCLUDE APPLICATION BELONGING TO GROUP OF INSTALLED FRAGMENT BUNDLE?
S7106
NO
S7117
OUTPUT WARNING "APPLICATION BELONGING TO GROUP OF INSTALLED FRAGMENT BUNDLE HAS NOT BEEN INSTALLED"
2
YES
S7107
PERFORM PROCESSING SEQUENTIALLY FOR APPLICATIONS BELONGING TO GROUP
HAS PROCESSING TARGET APPLICATION BEEN STARTED?
S7108
NO
YES
S7109
STOP PROCESSING TARGET APPLICATION
ACQUIRE STORAGE UPPER LIMIT VALUE OF MANIFEST OF PROCESSING TARGET APPLICATION
S7110
ACQUIRE STORAGE USE AMOUNT OF PROCESSING TARGET APPLICATION
S7111
ACQUIRE SIZE OF PROGRAM BODY FILE OF PROCESSING TARGET APPLICATION
S7112
PROCESS NEXT PROCESSING TARGET APPLICATION
S7113
1

F I G. 7D
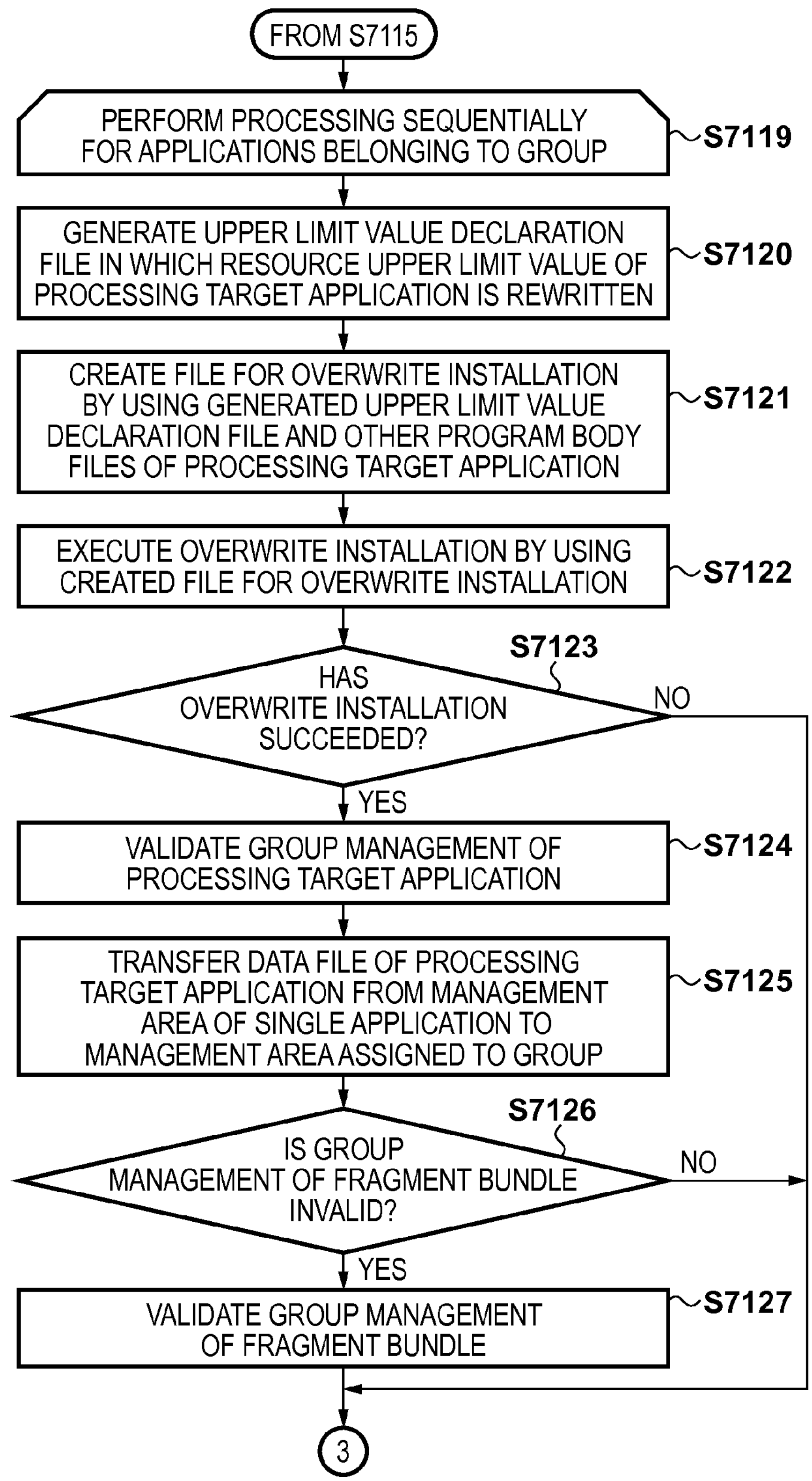

F I G. 7E
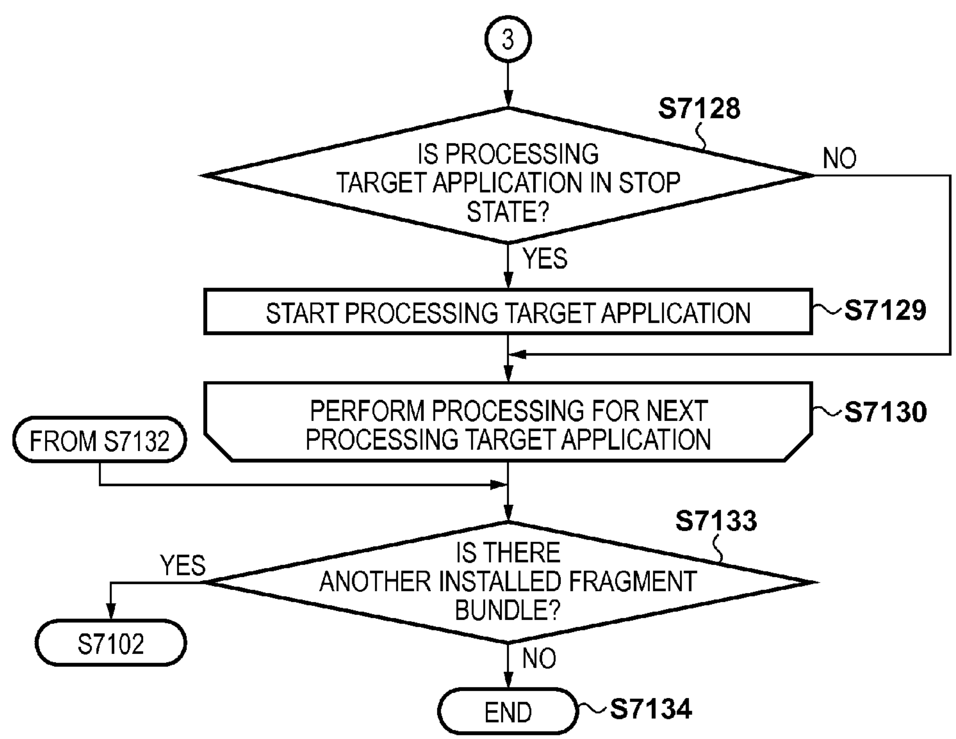

F I G. 7F
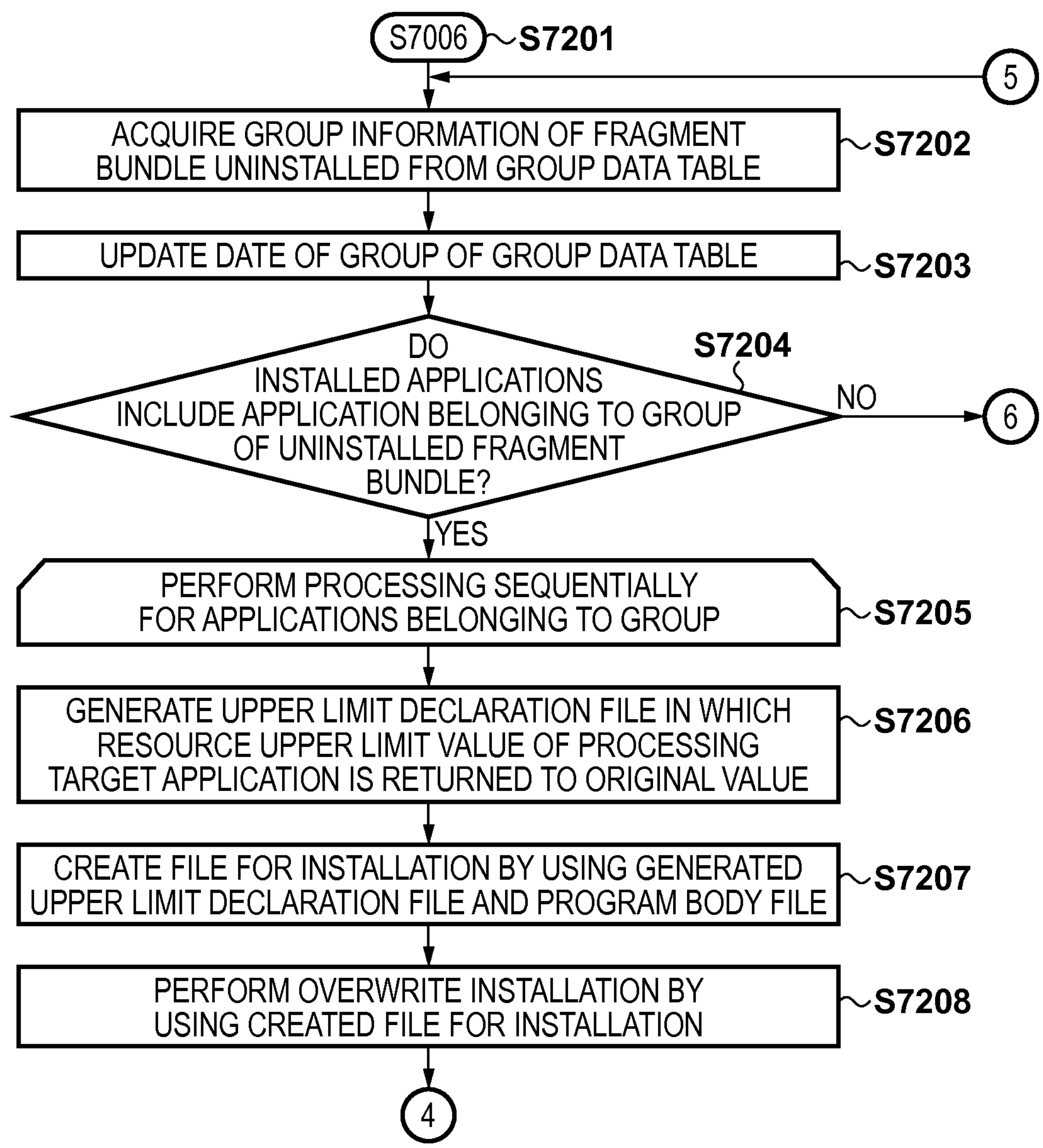

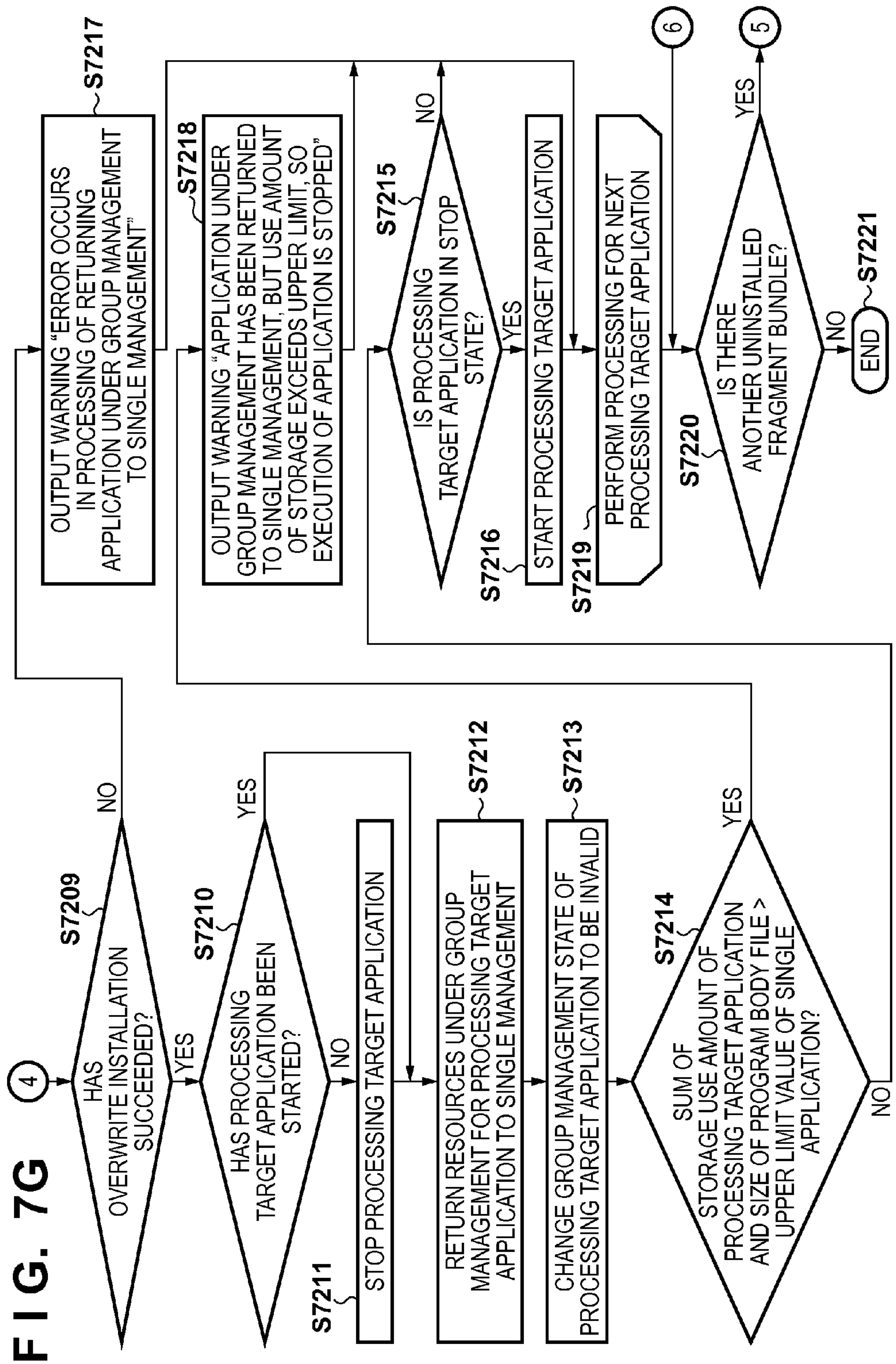
FIG. 7G
4
S7209
HAS OVERWRITE INSTALLATION SUCCEEDED?
YES
NO
S7210
HAS PROCESSING TARGET APPLICATION BEEN STARTED?
YES
NO
S7211
STOP PROCESSING TARGET APPLICATION
S7212
RETURN RESOURCES UNDER GROUP MANAGEMENT FOR PROCESSING TARGET APPLICATION TO SINGLE MANAGEMENT
S7213
CHANGE GROUP MANAGEMENT STATE OF PROCESSING TARGET APPLICATION TO BE INVALID
S7214
SUM OF STORAGE USE AMOUNT OF PROCESSING TARGET APPLICATION AND SIZE OF PROGRAM BODY FILE > UPPER LIMIT VALUE OF SINGLE APPLICATION?
YES
NO
S7217
OUTPUT WARNING "ERROR OCCURS IN PROCESSING OF RETURNING APPLICATION UNDER GROUP MANAGEMENT TO SINGLE MANAGEMENT"
S7218
OUTPUT WARNING "APPLICATION UNDER GROUP MANAGEMENT HAS BEEN RETURNED TO SINGLE MANAGEMENT, BUT USE AMOUNT OF STORAGE EXCEEDS UPPER LIMIT, SO EXECUTION OF APPLICATION IS STOPPED"
S7215
IS PROCESSING TARGET APPLICATION IN STOP STATE?
YES
NO
S7216
START PROCESSING TARGET APPLICATION
S7219
PERFORM PROCESSING FOR NEXT PROCESSING TARGET APPLICATION
6
S7220
IS THERE ANOTHER UNINSTALLED FRAGMENT BUNDLE?
YES
5
NO
END
S7221

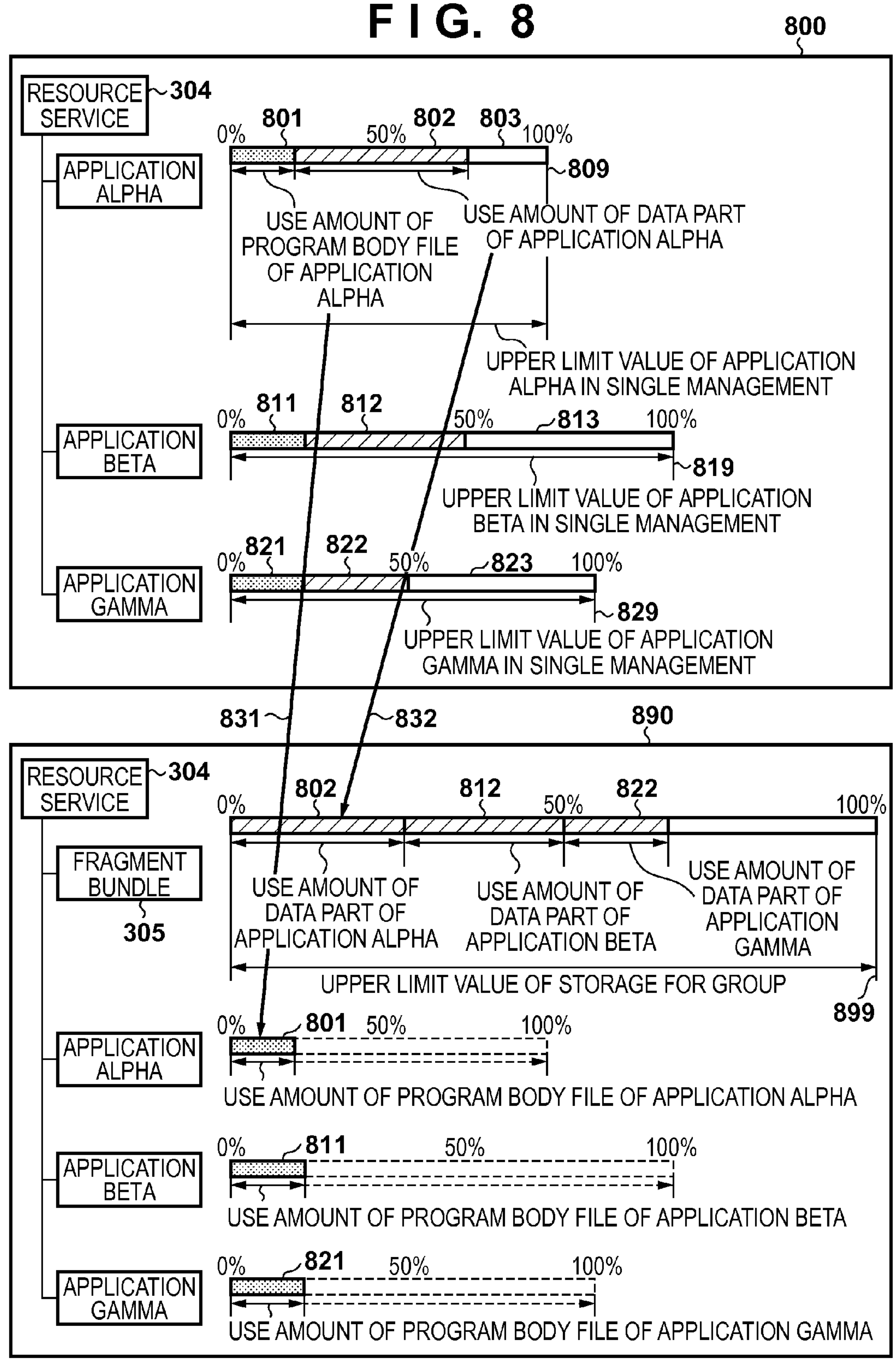
FIG. 8
800
RESOURCE SERVICE
304
APPLICATION ALPHA
0%
801
50%
802
803
100%
809
USE AMOUNT OF PROGRAM BODY FILE OF APPLICATION ALPHA
USE AMOUNT OF DATA PART OF APPLICATION ALPHA
UPPER LIMIT VALUE OF APPLICATION ALPHA IN SINGLE MANAGEMENT
APPLICATION BETA
811
812
50%
813
100%
819
UPPER LIMIT VALUE OF APPLICATION BETA IN SINGLE MANAGEMENT
APPLICATION GAMMA
821
822
823
829
UPPER LIMIT VALUE OF APPLICATION GAMMA IN SINGLE MANAGEMENT
831
832
890
RESOURCE SERVICE
304
FRAGMENT BUNDLE
305
802
812
822
USE AMOUNT OF DATA PART OF APPLICATION ALPHA
USE AMOUNT OF DATA PART OF APPLICATION BETA
USE AMOUNT OF DATA PART OF APPLICATION GAMMA
UPPER LIMIT VALUE OF STORAGE FOR GROUP
899
APPLICATION ALPHA
801
USE AMOUNT OF PROGRAM BODY FILE OF APPLICATION ALPHA
APPLICATION BETA
811
USE AMOUNT OF PROGRAM BODY FILE OF APPLICATION BETA
APPLICATION GAMMA
821
USE AMOUNT OF PROGRAM BODY FILE OF APPLICATION GAMMA

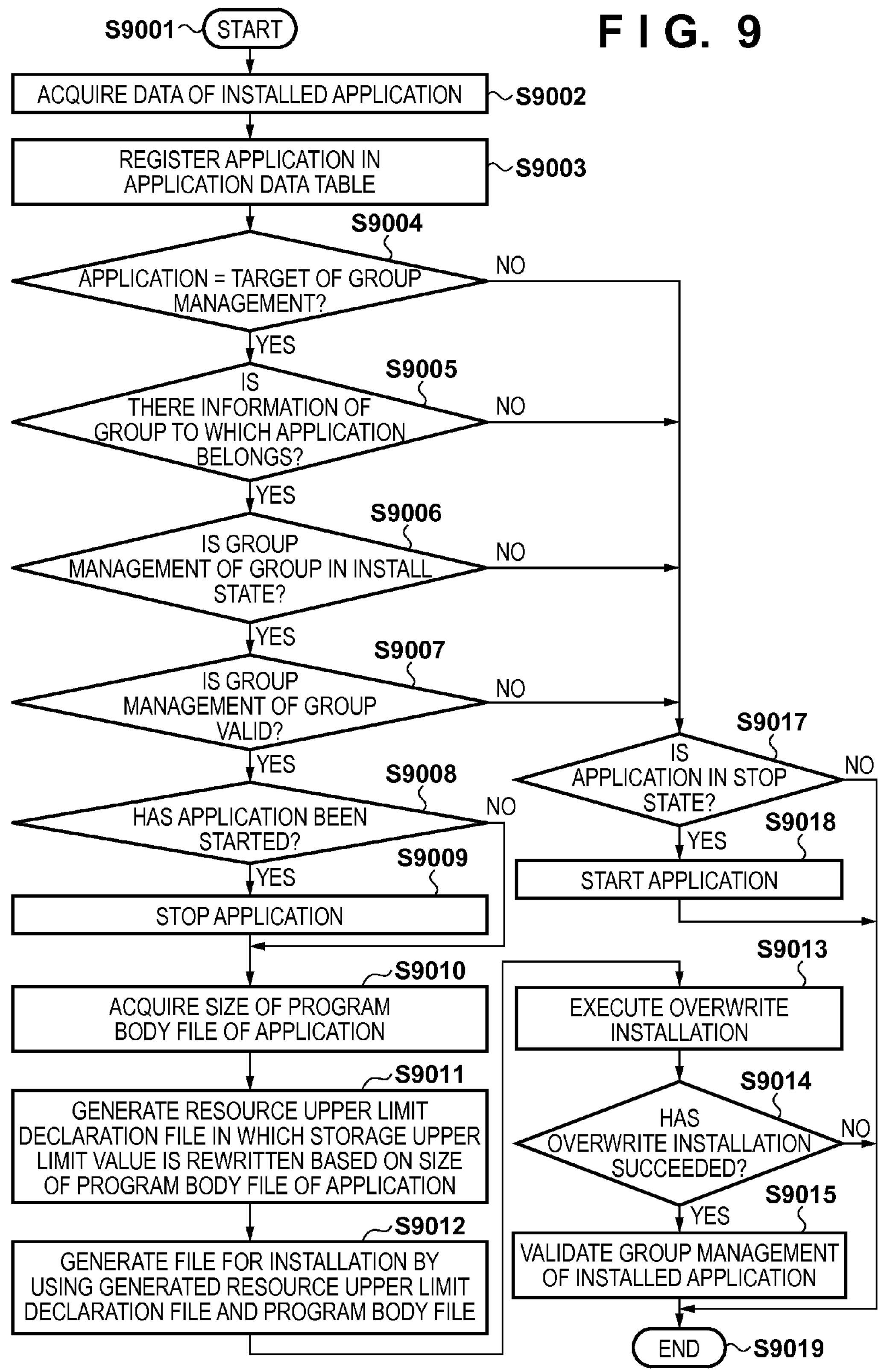
FIG. 9
S9001
START
ACQUIRE DATA OF INSTALLED APPLICATION
S9002
REGISTER APPLICATION IN APPLICATION DATA TABLE
S9003
S9004
APPLICATION = TARGET OF GROUP MANAGEMENT?
NO
YES
S9005
IS THERE INFORMATION OF GROUP TO WHICH APPLICATION BELONGS?
NO
YES
S9006
IS GROUP MANAGEMENT OF GROUP IN INSTALL STATE?
NO
YES
S9007
IS GROUP MANAGEMENT OF GROUP VALID?
NO
YES
S9008
HAS APPLICATION BEEN STARTED?
NO
YES
S9009
STOP APPLICATION
S9010
ACQUIRE SIZE OF PROGRAM BODY FILE OF APPLICATION
S9011
GENERATE RESOURCE UPPER LIMIT DECLARATION FILE IN WHICH STORAGE UPPER LIMIT VALUE IS REWRITTEN BASED ON SIZE OF PROGRAM BODY FILE OF APPLICATION
S9012
GENERATE FILE FOR INSTALLATION BY USING GENERATED RESOURCE UPPER LIMIT DECLARATION FILE AND PROGRAM BODY FILE
S9017
IS APPLICATION IN STOP STATE?
NO
YES
S9018
START APPLICATION
S9013
EXECUTE OVERWRITE INSTALLATION
S9014
HAS OVERWRITE INSTALLATION SUCCEEDED?
NO
YES
S9015
VALIDATE GROUP MANAGEMENT OF INSTALLED APPLICATION
END
S9019

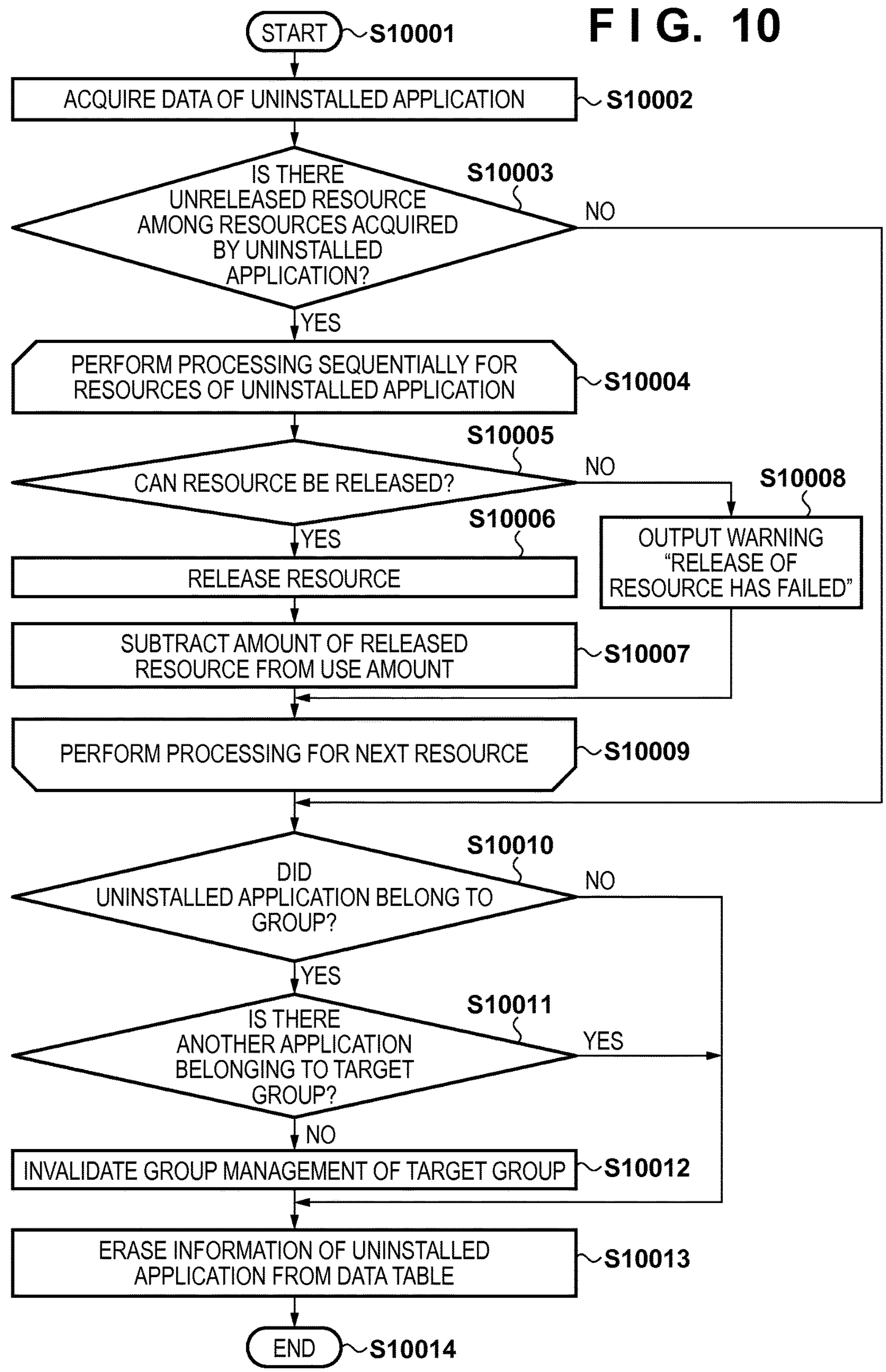
F I G. 10
START
S10001
ACQUIRE DATA OF UNINSTALLED APPLICATION
S10002
IS THERE UNRELEASED RESOURCE AMONG RESOURCES ACQUIRED BY UNINSTALLED APPLICATION?
S10003
NO
YES
PERFORM PROCESSING SEQUENTIALLY FOR RESOURCES OF UNINSTALLED APPLICATION
S10004
S10005
CAN RESOURCE BE RELEASED?
NO
S10008
OUTPUT WARNING "RELEASE OF RESOURCE HAS FAILED"
YES
S10006
RELEASE RESOURCE
SUBTRACT AMOUNT OF RELEASED RESOURCE FROM USE AMOUNT
S10007
PERFORM PROCESSING FOR NEXT RESOURCE
S10009
S10010
DID UNINSTALLED APPLICATION BELONG TO GROUP?
NO
YES
S10011
IS THERE ANOTHER APPLICATION BELONGING TO TARGET GROUP?
YES
NO
INVALIDATE GROUP MANAGEMENT OF TARGET GROUP
S10012
ERASE INFORMATION OF UNINSTALLED APPLICATION FROM DATA TABLE
S10013
END
S10014

FIG. 11A

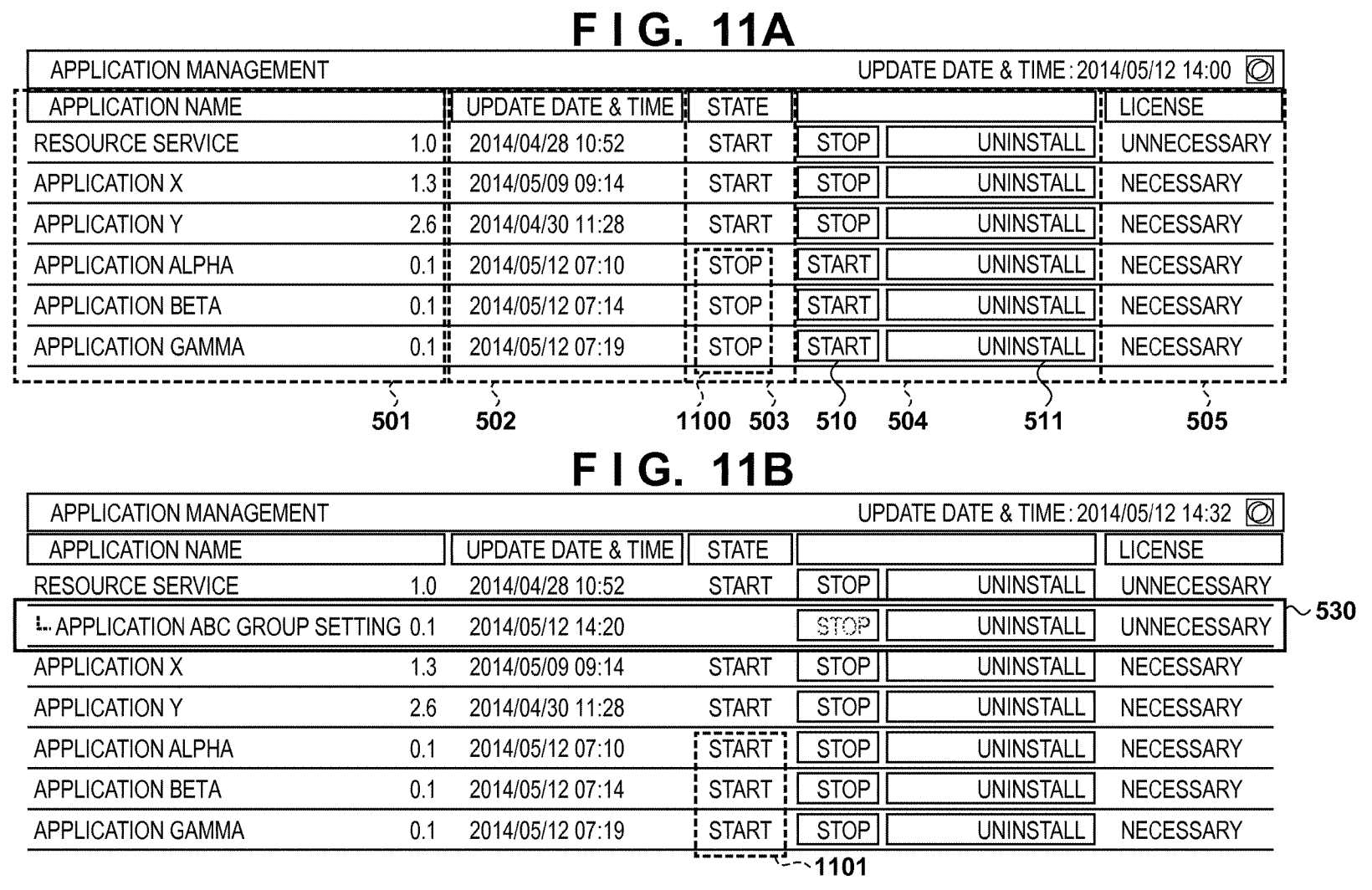

APPLICATION MANAGEMENT — UPDATE DATE & TIME : 2014/05/12 14:00

| APPLICATION NAME | | UPDATE DATE & TIME | STATE | | | LICENSE |
|---|---|---|---|---|---|---|
| RESOURCE SERVICE | 1.0 | 2014/04/28 10:52 | START | STOP | UNINSTALL | UNNECESSARY |
| APPLICATION X | 1.3 | 2014/05/09 09:14 | START | STOP | UNINSTALL | NECESSARY |
| APPLICATION Y | 2.6 | 2014/04/30 11:28 | START | STOP | UNINSTALL | NECESSARY |
| APPLICATION ALPHA | 0.1 | 2014/05/12 07:10 | STOP | START | UNINSTALL | NECESSARY |
| APPLICATION BETA | 0.1 | 2014/05/12 07:14 | STOP | START | UNINSTALL | NECESSARY |
| APPLICATION GAMMA | 0.1 | 2014/05/12 07:19 | STOP | START | UNINSTALL | NECESSARY |

APPLICATION MANAGEMENT — UPDATE DATE & TIME : 2014/05/12 14:32

| APPLICATION NAME | | UPDATE DATE & TIME | STATE | | | LICENSE |
|---|---|---|---|---|---|---|
| RESOURCE SERVICE | 1.0 | 2014/04/28 10:52 | START | STOP | UNINSTALL | UNNECESSARY |
| APPLICATION ABC GROUP SETTING | 0.1 | 2014/05/12 14:20 | | STOP | UNINSTALL | UNNECESSARY |
| APPLICATION X | 1.3 | 2014/05/09 09:14 | START | STOP | UNINSTALL | NECESSARY |
| APPLICATION Y | 2.6 | 2014/04/30 11:28 | START | STOP | UNINSTALL | NECESSARY |
| APPLICATION ALPHA | 0.1 | 2014/05/12 07:10 | START | STOP | UNINSTALL | NECESSARY |
| APPLICATION BETA | 0.1 | 2014/05/12 07:14 | START | STOP | UNINSTALL | NECESSARY |
| APPLICATION GAMMA | 0.1 | 2014/05/12 07:19 | START | STOP | UNINSTALL | NECESSARY |

530 1101

F I G. 12A
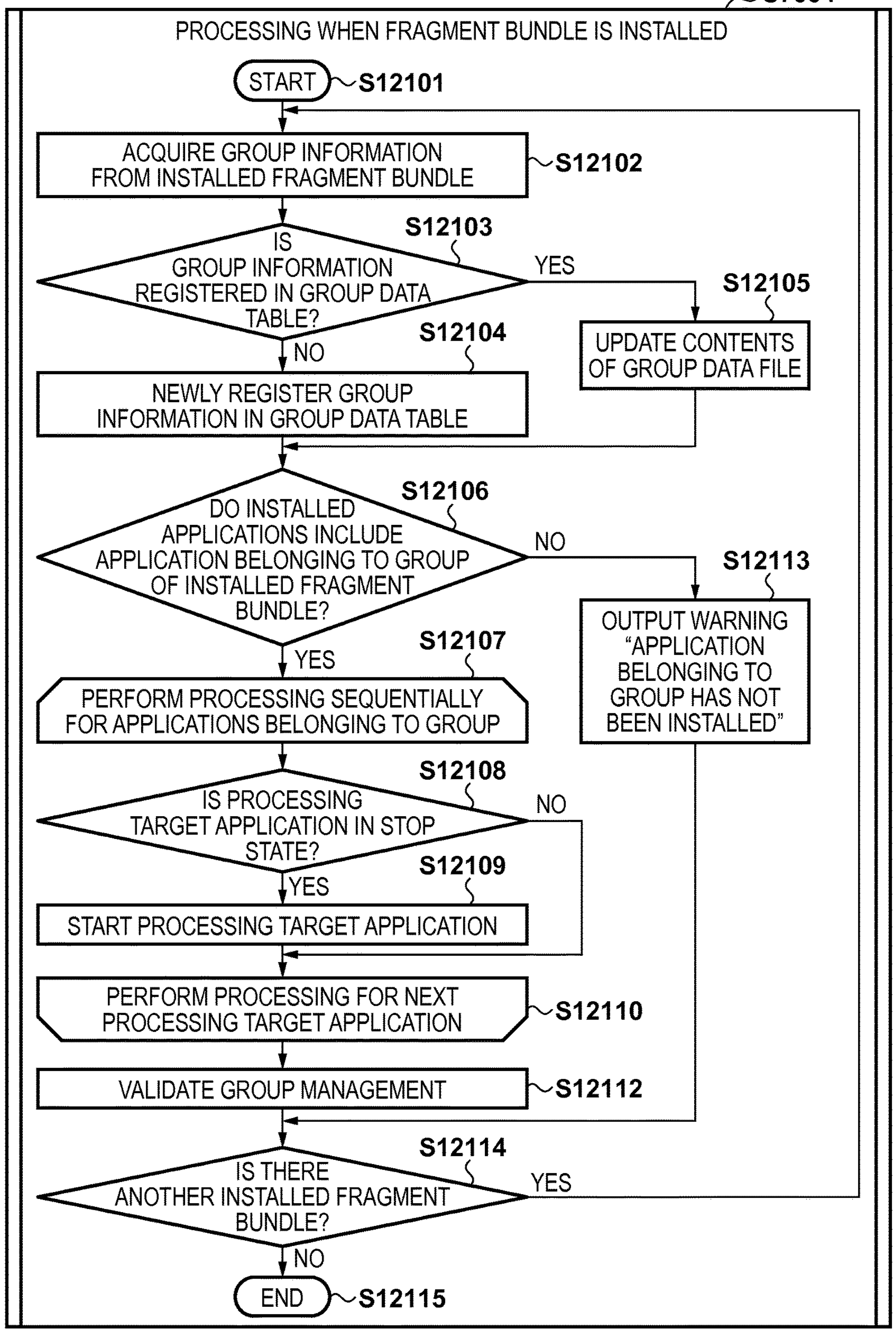

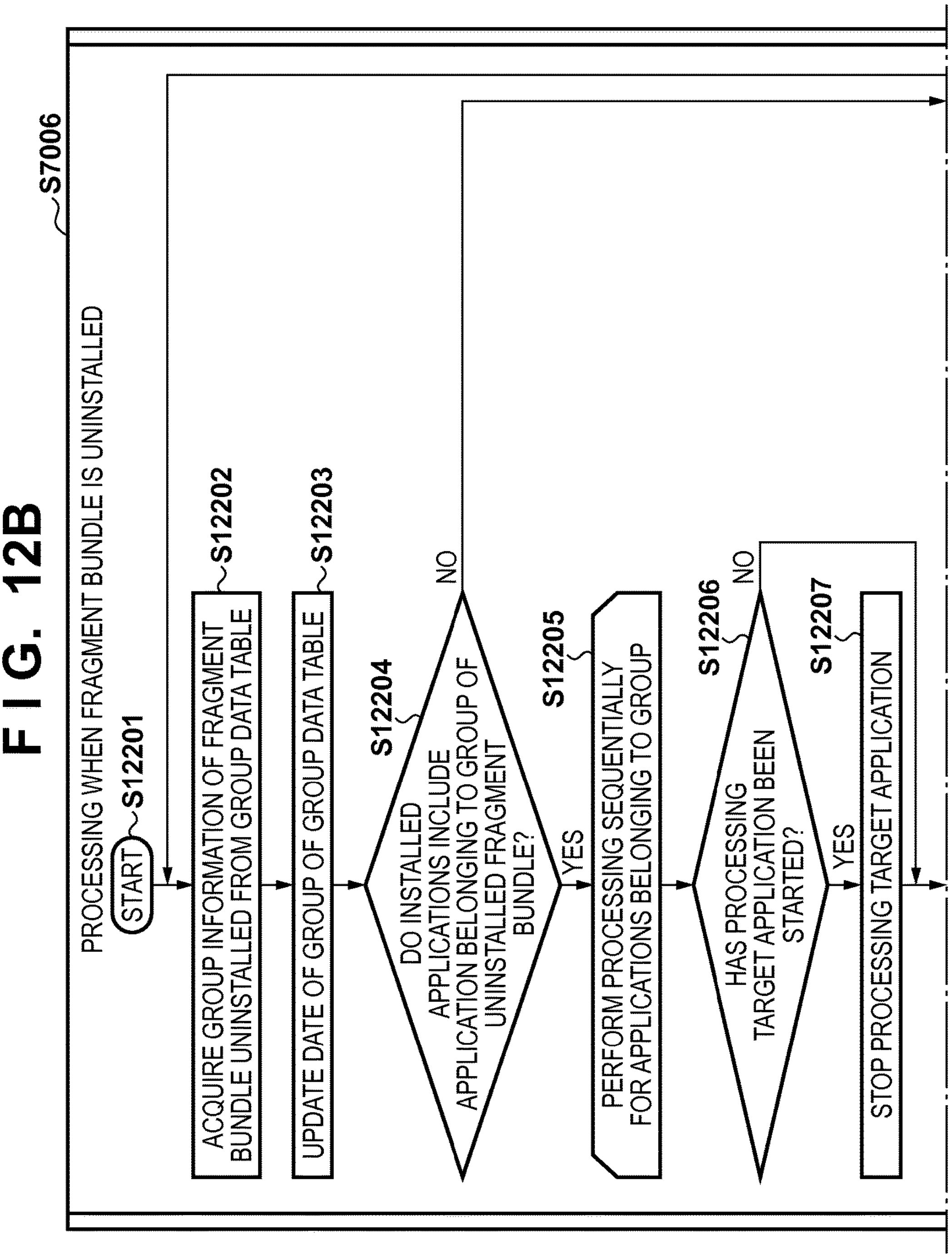
F I G. 12B
S7006
PROCESSING WHEN FRAGMENT BUNDLE IS UNINSTALLED
START
S12201
ACQUIRE GROUP INFORMATION OF FRAGMENT BUNDLE UNINSTALLED FROM GROUP DATA TABLE
S12202
UPDATE DATE OF GROUP OF GROUP DATA TABLE
S12203
DO INSTALLED APPLICATIONS INCLUDE APPLICATION BELONGING TO GROUP OF UNINSTALLED FRAGMENT BUNDLE?
S12204
NO
YES
PERFORM PROCESSING SEQUENTIALLY FOR APPLICATIONS BELONGING TO GROUP
S12205
HAS PROCESSING TARGET APPLICATION BEEN STARTED?
S12206
NO
YES
STOP PROCESSING TARGET APPLICATION
S12207

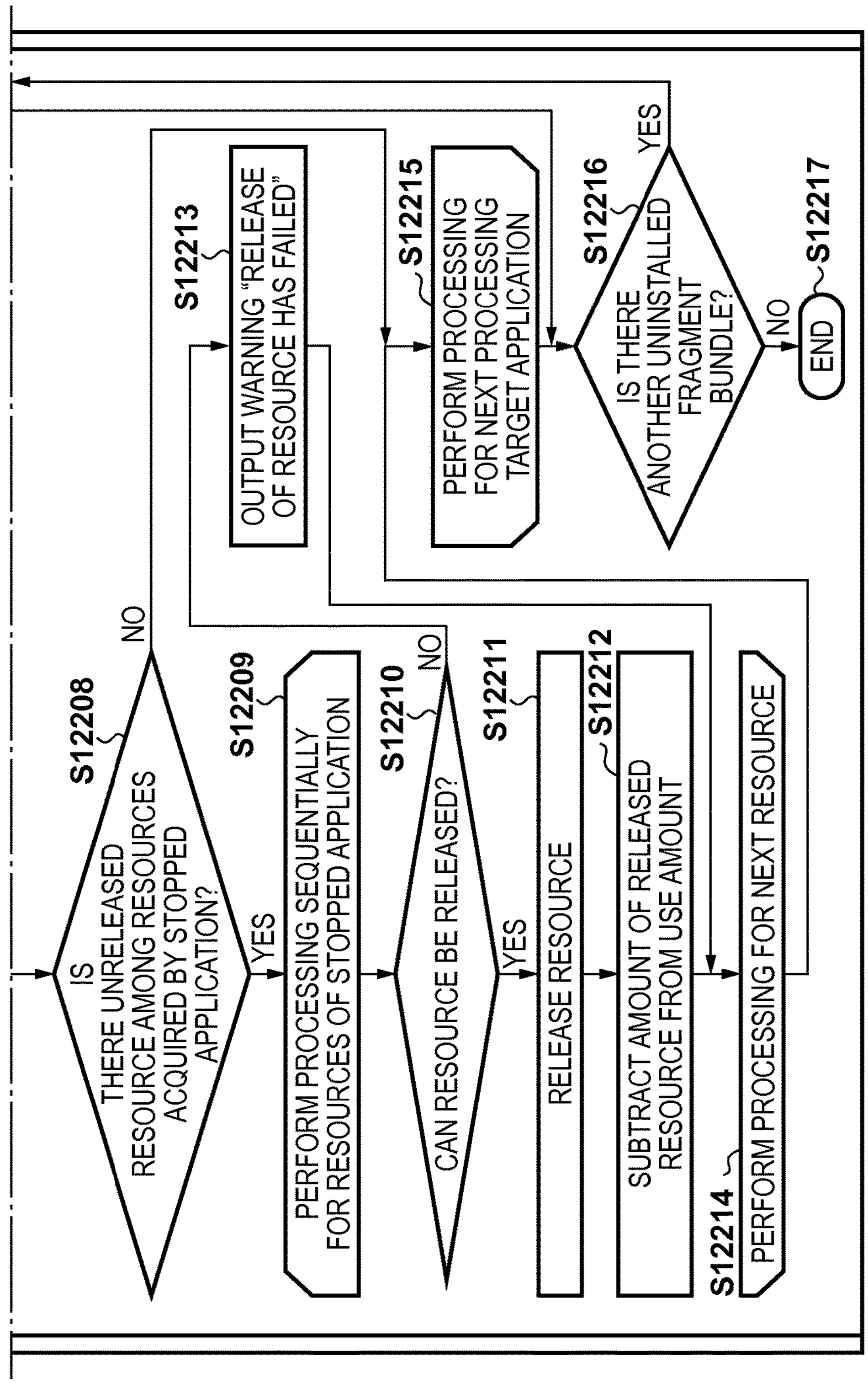
F I G. 12C
S12208
IS THERE UNRELEASED RESOURCE AMONG RESOURCES ACQUIRED BY STOPPED APPLICATION?
YES
NO
S12209
PERFORM PROCESSING SEQUENTIALLY FOR RESOURCES OF STOPPED APPLICATION
S12210
CAN RESOURCE BE RELEASED?
YES
NO
S12211
RELEASE RESOURCE
S12212
SUBTRACT AMOUNT OF RELEASED RESOURCE FROM USE AMOUNT
S12214
PERFORM PROCESSING FOR NEXT RESOURCE
S12213
OUTPUT WARNING "RELEASE OF RESOURCE HAS FAILED"
S12215
PERFORM PROCESSING FOR NEXT PROCESSING TARGET APPLICATION
S12216
IS THERE ANOTHER UNINSTALLED FRAGMENT BUNDLE?
YES
NO
S12217
END F I G. 13
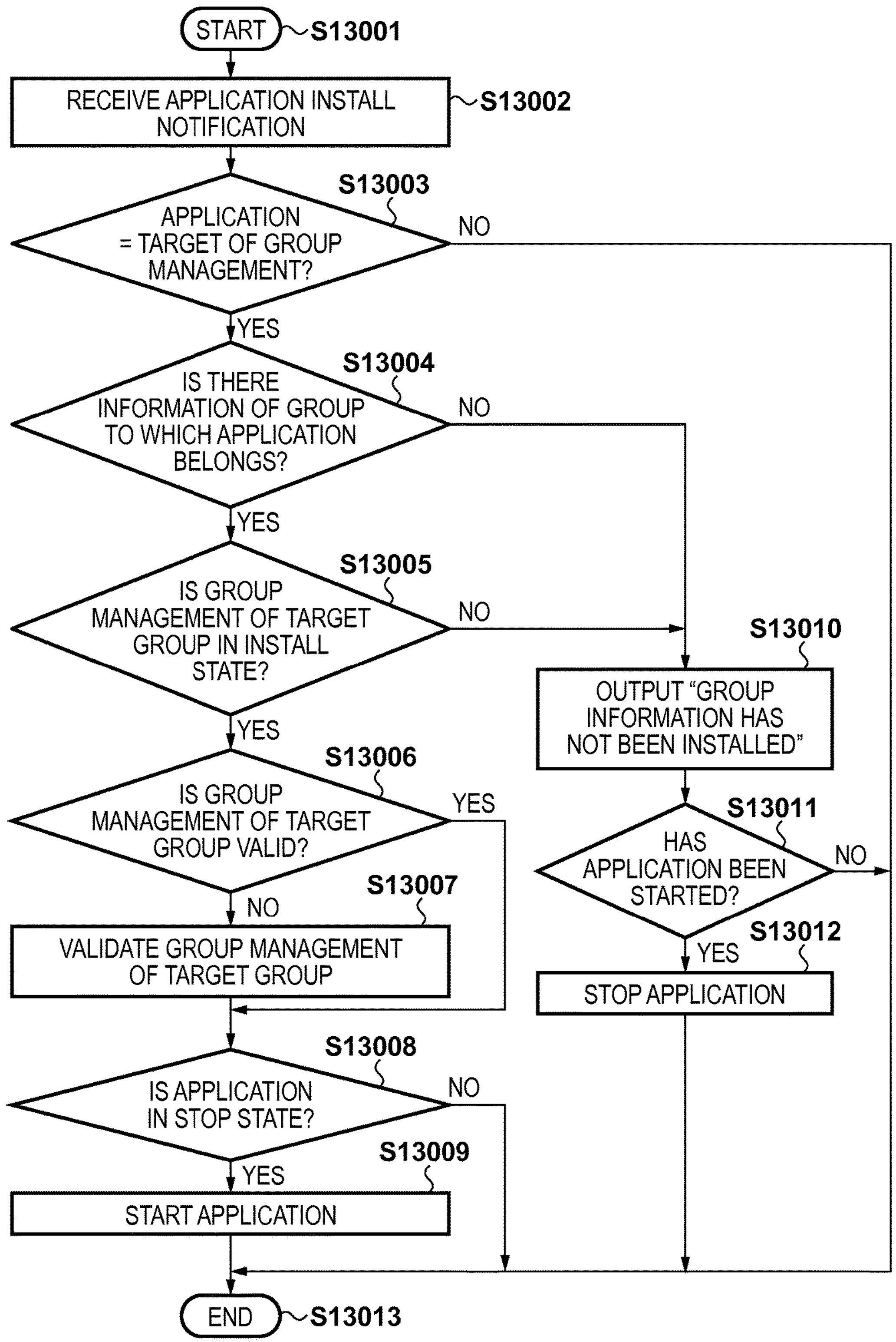

IMAGE FORMING APPARATUS AND RESOURCE MANAGEMENT METHOD

BACKGROUND OF THE INVENTION

Field of the Invention

The present invention relates to an image forming apparatus and resource management method for dynamically managing the use amount of a resource used by applications in an execution environment for installing and executing a plurality of embedded applications.

Description of the Related Art

Conventionally in an embedded application execution environment, the total amount of a resource, which is a general computer resource used by an application, is generally limited. The following is therefore performed in general. More specifically, an upper limit value is set for the amount of the resource used by the application. In addition, it is confirmed in an inspection stage that the amount of use by the application does not exceed the upper limit value, thereby guaranteeing that the application operates stably.

In an embedded application execution environment where a plurality of such applications are assumed to operate, an application management framework monitors the use amount of a resource used by the applications installed in the execution environment. More specifically, when installing applications in the execution environment, all the installed applications are controlled not to exceed the total amount of a resource provided by the execution environment. At this time, as for an application exceeding the limitation, installation of it is inhibited. Such a resource management apparatus and resource management method are generally provided.

There is also provided a technique of suppressing the use amount of a resource between a plurality of applications by detecting a state in which a plurality of applications conflict with each other over the use of the resource, and controlling the applications. For example, according to a technique disclosed in Japanese Patent Laid-Open No. 2004-362425, a resource management apparatus includes a database that gives in advance, to a plurality of applications, priorities for using a resource. In this case, the use of the resource is controlled by providing a mechanism that generates an error when one application is to use the resource, but another application of a higher priority is using it.

In Japanese Patent Laid-Open No. 8-328884, a resource management apparatus gives in advance, to a plurality of applications, priorities for using a resource. In addition, this resource management apparatus includes a management table representing the necessity of exclusive control. When an application of a low priority is to use a resource requiring exclusive control, the application is stopped till the completion of using the resource by an application of a high priority, thereby controlling a conflict.

In a technique disclosed in Japanese Patent Laid-Open No. 2010-39689, when an application conflicts with another specific application over the use of a resource, the following mechanisms are provided in the other application. More specifically, a screen is provided so that the administrator can know the amount of the resource currently used by the other application. Further, an interface is provided so that the application can know the consumption amount of the resource by the other application. With these mechanisms, the application confirms the use amount of the resource by the other application, and then starts the use of the resource by itself, thereby avoiding a conflict.

However, these techniques have the following problems. More specifically, when the sum of upper limit values given to respective applications exceeds the use amount of a resource that can be provided by the overall system, these applications cannot be simultaneously installed. In practice, however, the use amounts of the resource by these applications hardly simultaneously reach their upper limits during the operation. This poses a problem that the use amount of a necessary resource can be provided in practice, but these applications cannot be simultaneously arranged in the system.

The techniques disclosed in Japanese Patent Laid-Open Nos. 2004-362425 and 8-328884, priorities are given so that an application of a low priority cannot use a resource upon generation of a conflict over the resource. By preventing the use amount from reaching the upper limit, these applications can be simultaneously arranged. However, until the resource becomes usable, processing by the application of a low priority is stopped after all. There is a problem that it becomes difficult to simultaneously use a plurality of applications that share a resource and have different priorities on the resource.

The technique disclosed in Japanese Patent Laid-Open No. 2010-39689 also has a problem. Before an application uses a resource, it confirms the use amount of the resource by another application and then controls the operation of the application. This technique therefore has an advantage in which a measure to, for example, perform another processing first is adopted and the progress of processing is not interrupted. However, to do this, the application needs to be equipped with such an interface in advance, and this technique cannot be applied to an application not equipped with the interface. When an application runs short of a resource, an application to which inquiries are made needs to be defined in advance, so the above-mentioned solution cannot be applied to an unexpected combination.

As described above, even if resource management of managing a resource consumption amount by an application not to exceed a resource amount that can be provided by an execution environment is statically performed at the time of installing an application, or even if the resource management is dynamically executed at the time of executing an installed application, it is difficult to perform appropriate resource management.

SUMMARY OF THE INVENTION

The present invention has been made in consideration of the related art, and provides an image forming apparatus and resource management method capable of appropriately adjusting a conflict between applications over a resource and efficiently using the resource.

The present invention comprises the following arrangement. That is, an image forming apparatus comprises: an acquisition unit configured to acquire information that defines an identifier of an application belonging to an application set, and a use resource amount declared for the application set; a specifying unit configured to specify an application set to which an application belongs, based on an identifier of the application in response to a call of a resource acquisition API from the application, and specify a use resource amount declared for the specified application set from the information; and a resource management unit configured to, when a value obtained by adding a resource amount requested by the application to a total resource amount used by the application set exceeds the use resource amount specified by the specifying unit, not transfer a resource object to the application, and when the value does not exceed the use resource amount declared, transfer the resource object to the application.

According to the present invention, a resource service can perform upper limit value management of a resource appropriately in both a single management state and a group management state for each application. The labor for properly managing and operating the application by the administrator can be greatly reduced.

Further features of the present invention will become apparent from the following description of exemplary embodiments with reference to the attached drawings.

BRIEF DESCRIPTION OF THE DRAWINGS

FIG. 1 is a view showing the overall arrangement of an apparatus according to the first and second embodiments of the present invention;

FIGS. 4A and 4B are views showing the contents of files constituting an application and a fragment bundle according to the first and second embodiments of the present invention;

FIGS. 5A and 5B are views showing examples of the screen of an application management framework according to the first embodiment of the present invention;

FIGS. 6A and 6B are tables showing the contents of a group data table according to the first and second embodiments of the present invention, and the contents of an application data table according to the first embodiment;

FIGS. 7B-7G are flowcharts showing processing by the resource service at the time of activation according to the first embodiment of the present invention;

FIG. 8 is a conceptual view showing a resource operation according to the first embodiment of the present invention;

FIG. 9 is a flowchart showing install processing for an application according to the first embodiment of the present invention;

FIG. 10 is a flowchart showing uninstall processing for an application according to the first embodiment of the present invention;

FIGS. 11A and 11B are views showing examples of the screen of an application management framework according to the second embodiment of the present invention;

FIG. 12A is a flowchart showing processing for a fragment bundle at the time of activation according to the second embodiment of the present invention;

FIGS. 12B and 12C are flowcharts showing processing for a fragment bundle at the time of activation according to the second embodiment of the present invention;

FIG. 13 is a flowchart showing install processing for an application according to the second embodiment of the present invention.

DESCRIPTION OF THE EMBODIMENTS

Figure 2:
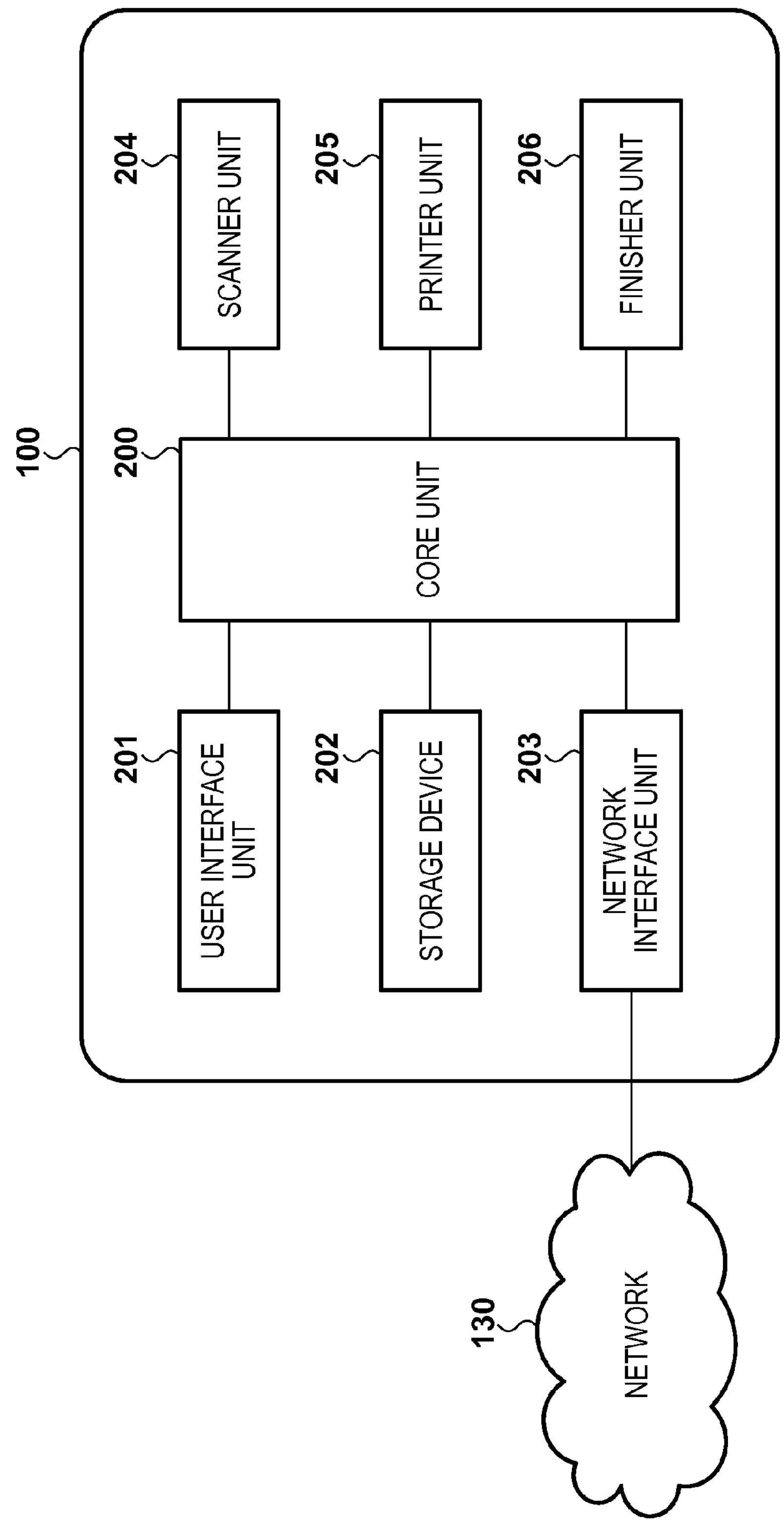
FIG. 2 is a block diagram showing the hardware arrangement of an image forming apparatus 100 according to the first and second embodiments of the present invention.

Embodiments for practicing the present invention will now be described with reference to the accompanying drawings.

First Embodiment

<Arrangement of Image Forming Apparatus>

FIG. 1 is a view showing the overall arrangement of an apparatus according to the first embodiment of the present invention. An image forming apparatus 100 is an image forming apparatus to which an invention according to this embodiment is applied. A network 130 is a network that connects the image forming apparatus 100 and an information processing apparatus 101. The information processing apparatus 101 is used to utilize the image forming apparatus 100 via the network 130.

An application 110 is an application A that is an example of an application running on the image forming apparatus 100. Similarly, an application 111 is an application B that is another example of an application running on the image forming apparatus 100. Further, an application 112 is an application C that is still another example of an application running on the image forming apparatus 100. One or a plurality of applications can be operated on the image forming apparatus 100. Three applications are exemplified here. An expression "application 11*n*" indicates one or a plurality of applications typified by the application A 110, application B 111, and application C 112. A general user and administrator can use the basic functions of the image forming apparatus 100, the application 11*n*, and a resource management apparatus for managing the image forming apparatus 100 and the application 11*n*. At the time of use, the image forming apparatus 100 can be operated directly or from the information processing apparatus 101 via the network 130.

FIG. 2 is a block diagram showing the hardware arrangement of the image forming apparatus 100. A core unit 200 includes a processor, memory, and the like, executes programs such as an operating system and application, and implements resource management according to this embodiment. A user interface unit 201 includes a touch panel, display, keyboard, and the like, outputs (displays) information to the user, and accepts an input such as an operation from the user. A storage device 202 is constituted by a hard disk or the like, and stores programs and data as files. A network interface unit 203 is a network interface for connecting to the network 130 which may be a LAN. A scanner unit 204 reads an original image, for example, optically and outputs image data. A printer unit 205 forms an image corresponding to image data on a medium. A finisher unit 206 performs finishing processing such as sorting, stapling, or punching on a sheet medium on which an image has been formed by the printer unit.

<Application of Image Forming Apparatus and its Execution Environment>

Figure 3:
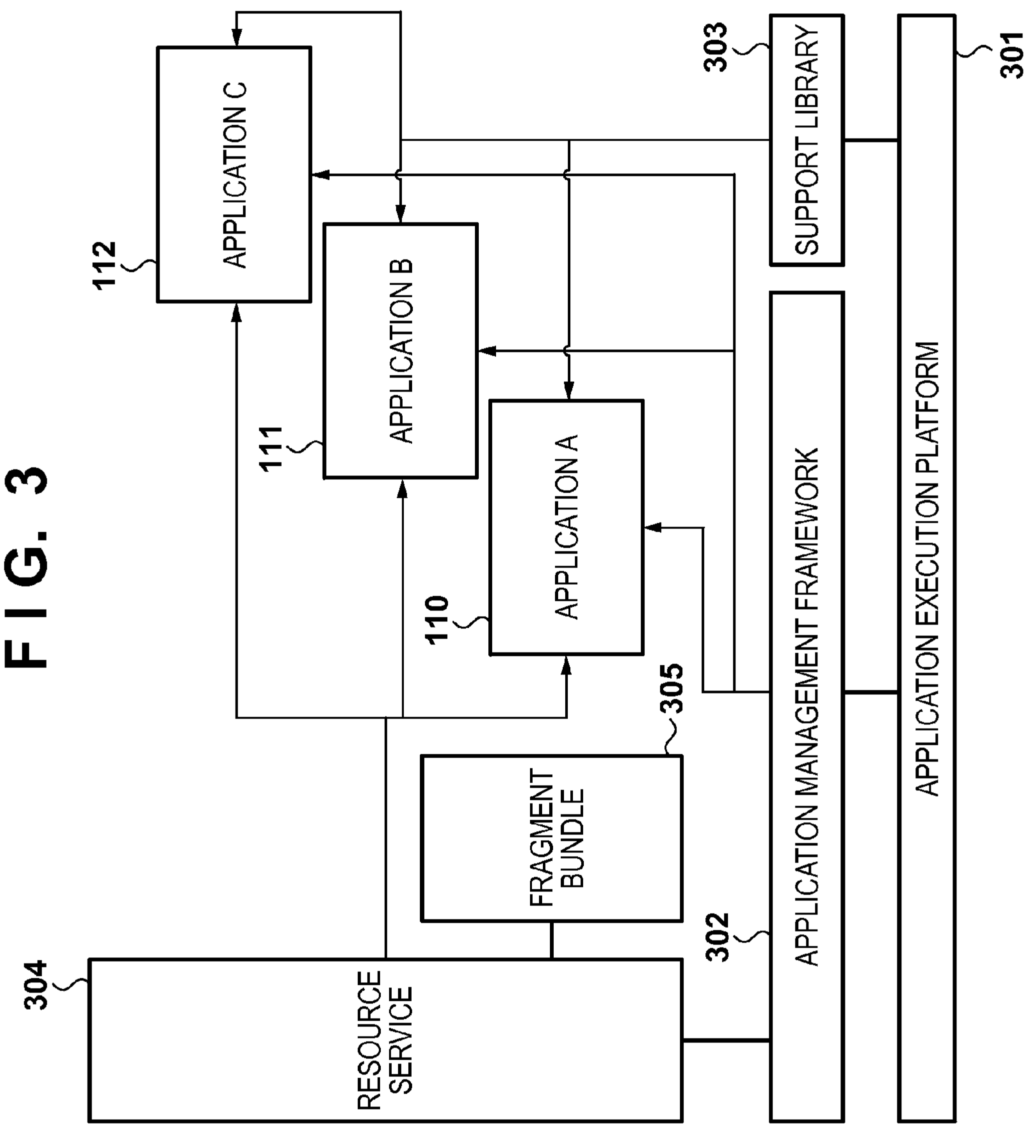
FIG. 3 is a block diagram showing the arrangement of an application execution environment according to the first and second embodiments of the present invention.

FIG. 3 shows an application execution environment for executing the application 11*n* on the image forming apparatus 100 according to this embodiment. An application execution platform 301 is a program for executing an application and is, for example, a Java® virtual machine (Java VM). An application management framework 302 is a framework for managing installation, uninstallation, execution, and stop of the application 11*n*, and is, for example, a Java®-based OSGi (Open Service Gateway initiative) framework. A support library 303 is a support library for using various functions of the image forming apparatus 100 by the application 11*n*. A resource service 304 is a program used to implement efficient management of a resource necessary for the application 11*n* in this embodiment. The resource service 304 is one of applications, but is not included in the application 11*n*. A fragment bundle 305 is a program that operates as a complementary module for the resource service 304. Note that an application in this embodiment is equivalent to a bundle when the application management framework 302 is the OSGi framework. The bundle is a program component (so-called plug-in) that can be installed, uninstalled, activated, or stopped independently of Java VM which is the Java® execution platform on the OSGi framework. The fragment bundle is a bundle, the contents of which can be shared with another bundle (called a host bundle) in the OSGi framework. The fragment bundle is provided as a Java® archive file having a manifest header, as in an application. This will be explained in detail with reference to FIGS. 4A and 4B and the like. Note that the fragment bundle in this example indicates not a general thing as described above, but a fragment bundle that is part of a resource service and functions for group management of a resource, which will be described later in the embodiment. Such a fragment bundle will also be particularly called a resource service fragment bundle in order to discriminate this fragment bundle from the fragment bundle of another application. Even when the environment of the application is not the OSGi framework, the fragment bundle includes a software component equivalent to the fragment bundle of the OSGi framework.

As a basic operation, the resource service 304 accepts a resource request from the application 11*n*. When acquiring a resource and releasing it after the end of use, the application 11*n* sends a resource acquisition request and a resource release request to the resource service 304. The resource service 304 performs an operation of confirming whether the application 11*n* that has sent the request operates in a state in which it has right to use the resource, and if the application 11*n* is in a state in which it does not have the right, sending back an error. When the application 11*n* has the right, the resource service 304 refers to the upper limit value of the use amount of the resource that is set for the application 11*n*. If the use amount does not reach the upper limit of the resource, the resource service 304 ensures the resource and sends it back to the application 11*n*. If the use amount exceeds the upper limit, the resource service 304 sends back an error. When the resource service 304 ensures the resource, it performs an operation of adding the newly ensured resource amount in order to grasp, by a numerical value, the current use amount of the resource by the application 11*n*. When the resource is released, the resource service 304 performs an operation of subtracting the released resource amount. Although the release of the resource rarely fails, if the release fails, an error is sent back and a warning is output to the administrator. Note that such a warning is output in other cases. More specifically, a warning of this type is output and transferred to the administrator by using a means such as display on an interface for the administrator in the resource service 304, or addition to the system log.

FIG. 4A is a view for explaining the contents of typical files constituting the application 11*n* according to this embodiment. The application 11*n* contains several types of files as its contents. An application execution code file 400 includes the execution codes of the application and the like. An application permanent data file 401 is a file containing permanent data of the application. An application resource upper limit declaration file 402 is a file for declaring the upper limit value of a resource used by the application, that is, a use resource declaration amount. Further, the application resource upper limit declaration file 402 includes the following descriptions as its contents. An application ID 410 is a description of the value of the application ID, that is, identifier of the application 11*n*. A group ID 411 is a description of a group ID designating a group to which the application 11*n* belongs. A resource upper limit value 412 is a resource upper limit value that is the declaration of the upper limit value of a resource used by the application 11*n*. The application resource upper limit declaration file 402 is equivalent to a manifest under the OSGi framework.

When installing the application 11*n* in the application execution environment and executing it, the application management framework 302 is used. As a basic operation, when the administrator issues a request to install the application 11*n*, the application management framework 302 performs an install operation. At this time, the application management framework 302 refers to the application resource upper limit declaration file 402, and determines whether a resource upper limit value declared there falls within the free space of a resource in the current application execution environment. If the resource upper limit value does not fall within the free space, installation fails.

The resource service 304 is also basically one of applications, and has the same arrangement as that of the application 11*n* shown in FIG. 4A. A feature that discriminates the resource service from the application 11*n* is that the resource service provides a common application programming interface (to be abbreviated as an "API" hereinafter) for providing a service to another unspecific application 11*n*. This API will be called a resource acquisition API. Another application can receive a service by the resource service via the resource acquisition API. However, a call for the API of the resource service is used by an application only after coding by the application, so some applications use the resource service and others do not. However, this example is premised on that all applications use the resource service to acquire a resource.

FIG. 4B is a view for explaining the contents of typical files constituting the fragment bundle 305. The fragment bundle 305 also basically has the same arrangement as that of the application 11*n* shown in FIG. 4A. A fragment bundle execution code file 420 is a file including the execution codes of the fragment bundle. A fragment bundle permanent data file 421 is a file containing permanent data of the fragment bundle. A fragment bundle resource upper limit declaration file 422 is a file for declaring the upper limit value of a resource used by the fragment bundle. A fragment bundle ID 430 indicates the ID of the fragment bundle. A group ID 431 indicates the group ID of a group declared by the fragment bundle 305. A resource upper limit value 432 indicates a resource upper limit value by which an increased resource use amount is declared for each resource when the fragment bundle 305 is added to the resource service 304. This value does not simply indicate the upper limit of a resource consumed by the fragment bundle 305, but indicates the upper limit value of a resource (that is, the resource upper limit value of a group) consumed by applications managed for each group defined by the fragment bundle 305. However, this upper limit value does not include the size of a storage occupied by a body file when an application belonging to this group is installed. In other words, each application managed by the group can use each resource up to an upper limit that is a value declared in the resource upper limit value 432, and as for the storage, can further use an area occupied by the body file of each application. A member application ID 433 indicates the application ID of one or a plurality of applications 11*n* (also called an application set) belonging to, i.e., included in the group declared by the fragment bundle 305.

<Installation and Uninstallation of Fragment Bundle>

When the application management framework 302 is instructed to install the fragment bundle 305, it refers to the fragment bundle resource upper limit declaration file 422 of the fragment bundle 305, as in an application. Then, the application management framework 302 determines whether, even if the resource upper limit value 432 of each resource declared there is added to the current resource upper limit value of this resource for the resource service 304, the total resource upper limit value falls within the free space of the resource in the current application execution environment. In other words, a resource described by the resource upper limit value is ensured. A resource capacity that can be provided in the current application execution environment is given in advance. The current resource upper limit value is a value obtained by adding a resource upper limit value declared by an installed fragment bundle to a resource upper limit value originally declared by the resource service 304. If the total resource upper limit value falls within the free space, the installation of the fragment bundle 305 is completed. This also applies to installation of another application. Upon completion of the installation, the resource upper limit value 432 declared by the installed fragment bundle 305 is added to the current resource upper limit value of the resource service 304 serving as the addition destination. By this addition, the resource upper limit value of the application managed by the group is managed as the resource upper limit value of the resource service 304. For example, the resource (for example, storage) of an application managed by the group is alternatively ensured by the resource service 304. As the resource upper limit value 432, a value equal to or larger than a maximum value is desirably set, out of resource upper limit values for individual applications belonging to the group.

To the contrary, when the fragment bundle 305 is uninstalled, the resource upper limit value 432 declared by the fragment bundle 305 is subtracted from the current resource upper limit value of the resource service 304. Needless to say, subtraction is performed for each resource type. Note that this subtraction should be performed after releasing a shared resource managed by the resource service through a fragment bundle to be uninstalled, and is thus desirably performed after completing processing in FIGS. 7F and 7G (to be described later).

In this manner, the fragment bundle can be used to add a function later to the resource service serving as the host bundle, or exchange a function.

FIGS. 5A and 5B show examples of the screen (to be referred to as an application management screen) of the application management framework 302. A screen shown in FIG. 5A is a screen before installing the fragment bundle 305. A screen shown in FIG. 5B is a screen after installing the fragment bundle 305.

In FIG. 5A, an application name 501 is an application name display field. The names of the application 11*n* and resource service 304 are displayed here. Although not shown in FIG. 5A, even when the fragment bundle 305 is installed as shown in FIG. 5B, it is displayed as one application listed in the application name display field 501. As shown in FIG. 5B, the name (in this example, "application ABC group setting 0.1") of the fragment bundle 305 is displayed in the application name display field 501 for the fragment bundle 305.

An update date & time 502 is an update date & time display field representing dates & times when the application 11*n*, resource service 304, and fragment bundle 305 were updated. A state 503 is a state field representing the operation statuses of these applications and the like. In this example, "start" is displayed when an application operates, and "stop" is displayed when an application does not operate. A management action execution button 504 is a management action execution button display field. In this example, a "stop" button 510 and an "uninstall" button 511 are displayed for an application in the "start" state. The start/stop button 510 is a button for designating the start or stop of each of the application 11*n*, resource service 304, and fragment bundle 305 displayed on respective lines. Either "start" or "stop" is displayed in accordance with the operation state. The uninstall button 511 is an uninstall button for designating uninstallation of an application. In this embodiment, the start/stop button 510 and the uninstall button 511 are displayed in the management action execution button display field 504. A license 505 is a license display field for displaying whether the license is necessary for each of the application 11*n*, resource service 304, and fragment bundle 305 displayed on the respective lines.

In the screen example shown in FIG. 5A, the fragment bundle 305 has not been installed. In FIG. 5A, three applications displayed as "application ALPHA", "application BETA", and "application GAMMA" belong to one group. As indicated by update dates & times 520 of these applications, in a state in which the fragment bundle 305 has not been installed yet, the update dates & times of the applications 11*n* are the times when they were installed. The screen example shown in FIG. 5B is a state after installing the fragment bundle 305. To install the fragment bundle 305 by the administrator, he stops the resource service 304 with the start/stop button 510. Then, the administrator installs the fragment bundle 305 according to normal procedures. The administrator starts the resource service 304 again with the start/stop button 510. In response to this, the screen displays that the fragment bundle 305 has been installed, as indicated by a fragment bundle display line 530. In this state, the application 11*n* belonging to the group of group information indicated by the fragment bundle 305 is installed by overwrite immediately after installing the fragment bundle 305. In this installation, the new application resource upper limit declaration file 402 is applied. Hence, the update dates & times are updated, as indicated by update dates & times 540 of the applications belonging to this group.

In this screen example, the fragment bundle 305 is installed after installing the application 11*n* belonging to a group serving as a management target by the fragment bundle 305. Even in this embodiment, however, the application 11*n* can be installed later.

The application management screen shown in each of FIGS. 5A and 5B is displayed based on, for example, the attributes, states, and the like of applications including the fragment bundle, and the attributes and states are saved in a table that stores the attributes and states of installed applications, such as an application management table. For example, the necessity/nonnecessity of a license, the application name, and the update date & time are included as attributes. The operation state is included as a state. Even if an application is temporarily installed and then uninstalled, the item of this application may be left in the table and a state representing installation/uninstallation may be held. Installation or uninstallation of an application or a change of the state triggers updating of this table. Items held in a group data table and application data table shown in FIGS. 6A and 6B need not be managed in the application management table. However, information for a link to the table, for example, an application ID and a fragment bundle ID need to be repetitively held. When the application management framework 302 is the OSGi framework, the application management screen in each of FIGS. 5A and 5B is managed and displayed by the OSGi framework, and the application management table necessary for the display is also managed by the OSGi framework.

<Resource Service>

The resource service 304 will be explained anew. The resource service 304 is one of applications running on the application management framework 302. When the application management framework 302 is the OSGi framework, the OSGi framework has a mechanism of in parallel executing a plurality of Java® applications, and providing a service to a function use application (also called a service consumption bundle) via an application program interface (API) from a function providing application (also called a service bundle and equivalent to the resource service in this example) out of the applications. The application performs acquisition or release of a resource in accordance with a resource request or resource release to the resource service via the API. The acquisition and release of the resource are performed by objects (API) provided as Java standard classes, and the resource service implements an additional service for resource management by providing a wrapper class that wraps these standard classes. The additional service is a service of checking whether a resource to be assigned to a resource requesting application exceeds a declared resource upper limit value, if the resource exceeds the declared resource upper limit value, rejecting the request, and if it does not exceed the declared resource upper limit value, performing assignment. Generation of a resource and provision to an application are performed by functions provided by the wrapped standard classes.

A function provided by the resource service is performed via an API, as described above, and the API is implemented by an object generated for each service use application. In OSGi, an API is generated and provided in accordance with a request from a service use application that uses the API. The service use application requests services such as resource acquisition and release of the resource service serving as a service providing application by using the generated API.

In contrast, the resource service stores an assigned resource amount and a resource upper limit value serving as an assigned upper limit in association with an application ID for each application that uses the resource service, for example, each application for which the API of the resource service has been generated. The resource upper limit value is a value acquired from the resource upper limit value 412 of the application resource upper limit declaration file 402 of the application. Further, a resource upper limit value for each fragment bundle, that is, a resource upper limit value for each group is read from the fragment bundle resource upper limit declaration file 422 at the time of installation, and stored. In addition to the resource upper limit value, a resource amount assigned to the group is also stored in association with the group ID. For example, in OSGi, specifying and reading of the resource upper limit value from the application resource upper limit declaration file by the resource service 304 suffice to be performed as part of initialization processing of an API for an application when the application that uses the resource service is installed, execution is started, and generation of the API is requested of the resource service. Alternatively, in a framework other than OSGi, if no API object is generated, the resource upper limit value 412 may be referred to for each resource acquisition request.

When the resource service receives, for example, a resource acquisition request from an application, if the requesting application is a singly managed application, the resource amount assigned to the requesting application is referred to, and the sum of this value and a requested resource amount is compared with the resource upper limit value of this application. If the sum exceeds the resource upper limit value, the resource request is rejected, and a response indicative of this is sent back to the requesting application. If the sum does not exceed the resource upper limit value, the resource object is sent back to the requesting application, and the requested resource amount is added to the resource amount assigned to the requesting application. The resource object is an object generated to handle the resource by the application program. Transfer of the resource object to the application is equivalent to assignment of the requested resource to the application.

If a resource acquisition requesting application is an application managed by a group, a resource amount assigned to the group to which the requesting application belongs is referred to, and the sum of this value and a requested resource amount is compared with the resource upper limit value of the group. If the sum exceeds the resource upper limit value, the resource request is rejected, and a response indicative of this is sent back to the requesting application. If the sum does not exceed the resource upper limit value, the resource object is sent back to the requesting application, and the requested resource amount is added to the resource amount assigned to the group. In other words, the resource is shared by the application set managed by the group. If there is a resource request from an application belonging to the application set, the requested resource amount is added to a total resource amount used by the application set, and it is determined whether the result exceeds the resource upper limit value, that is, use resource declaration amount of the group. If the result does not exceed the use resource declaration amount, the resource is assigned to the requesting source. Note that group management of an application is performed by looking up an application data table 620 in FIG. 6B (to be described later), and confirming that an application ID is registered in the application data table 620 and the group management state is valid.

<Group Data Table and Application Data Table>

FIG. 6A schematically shows a group data table 600 out of data tables for holding data necessary to execute group management of the application **11*n* by the resource service 304 according to this embodiment. The group data table 600 is stored in, for example, the storage device 202. A fragment bundle ID field 601 is the holding field of the fragment bundle ID 430. A group ID field 602 is the holing field of the group ID 431. A detection time field 603 is the holding field of the time when the resource service 304 detected the fragment bundle 305 for the first time. The resource service 304 detects the fragment bundle 305 for the first time when the administrator stops the resource service 304 with the start/stop button 510, installs the fragment bundle 305, and then restarts the resource service 304. Similarly, a deletion detection time field 604 is the holding field of the time when the resource service 304 detected that the fragment bundle 305 which had been installed once and detected was deleted and disappeared. Similarly, deletion is detected at the time when the administrator performs the uninstall operation of the fragment bundle 305 and restarts the resource service 304. A management target application ID field 605 is the holding field of the application IDs 410 of applications that are managed as a group by the fragment bundle 305. A validation state field 606 is the holding field of a validation state in which whether the fragment bundle is valid is recorded. The validation state field 606 can hold three states "valid", "invalid", and "uninstalled". An entry 610 is the entry of the group data table 600 regarding one given fragment bundle 305**.

FIG. 6B schematically shows the application data table 620 out of data tables for holding data necessary to execute group management of the application 11$n$ by the resource service 304 according to this embodiment. The application data table 620 is also stored in, for example, the storage device 202. An application ID field 621 is the holding field of the application ID 410. A group ID field 622 is the holing field of the group ID 431. A version field 623 is the holding field of the version of the application 11$n$ on each line. A resource upper limit value field 624 in single management is the holding field of a resource upper limit value in single management that holds the resource upper limit value 412 declared by the application resource upper limit declaration file 402 in a state not under group management of the applications 11$n$. A body file size field 625 is the value of the size of the program body file of each application 11$n$. A value obtained by subtracting the value 625 of the size of the program body file from a storage value declared by the resource upper limit value 412 is the size of a storage area for data that may be used in a state not under group management of the application 11$n$. A group management state field 626 is the holding field of a group management state representing whether the application 11$n$ is under group management.

<Resource Service Activation Procedures>

Figure 7A:
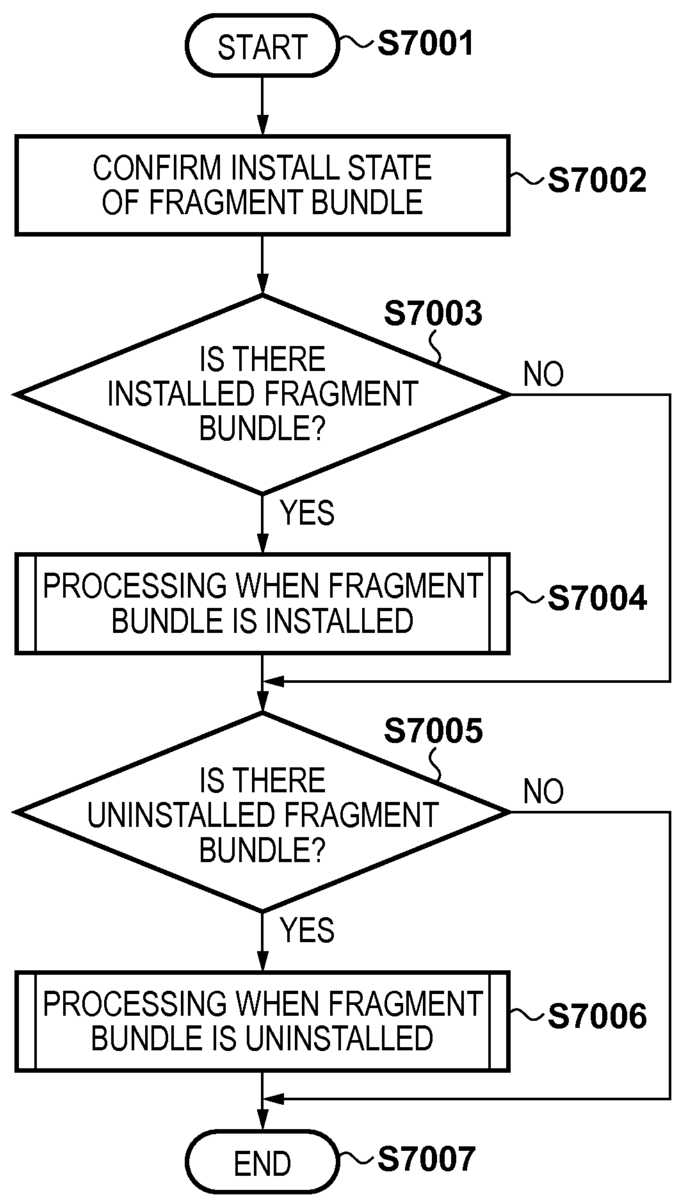
FIG. 7A is a flowchart showing processing by a resource service at the time of activation according to the first embodiment of the present invention.
Figure 7C:
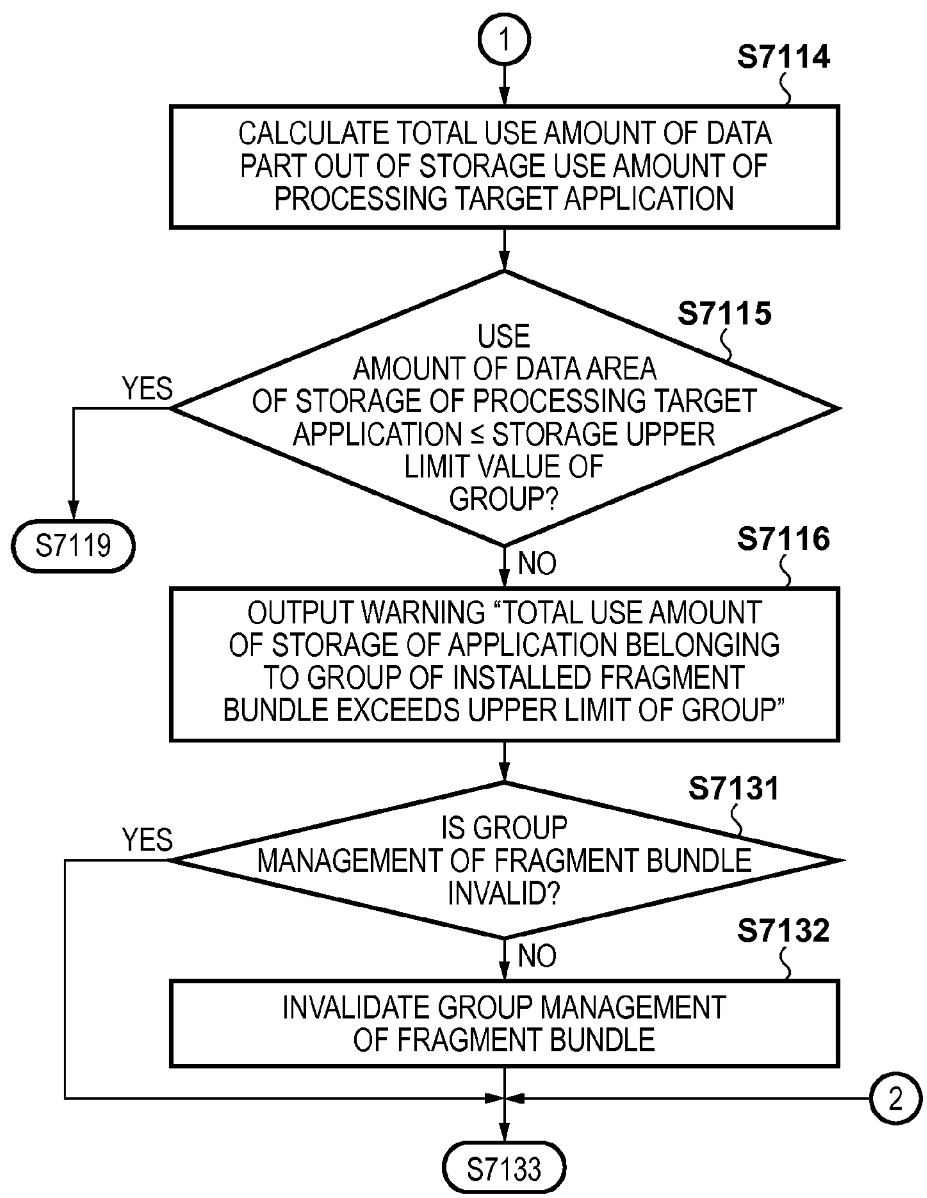

FIG. 7A is a flowchart showing the sequence of processing by the resource service when the resource service 304 is activated according to this embodiment. As described above, group information can be additionally recognized by additionally installing the fragment bundle 305 holding group information for the resource service 304. Similarly, the group information can be removed from under the control of the resource service by uninstalling the fragment bundle 305. At this time, since the resource service 304 operates as a host bundle with respect to the fragment bundle 305, the resource service needs to be stopped temporarily before installing and uninstalling the fragment bundle 305. The installation and uninstallation of the fragment bundle 305 are executed by the application management framework 302. The processing to be described here is executed when the fragment bundle 305 is installed or uninstalled and then the resource service 304 is activated anew from the stop state.

The process starts from step S7001. In step S7002, the resource service 304 first confirms the install state of the fragment bundle 305. For example, it is checked whether the fragment bundle 305, which did not exist till a previous end, has been newly installed, or whether the fragment bundle 305, which existed till a previous end, has been uninstalled. The check can be implemented by referring to information about applications managed by the application management framework 302, for example, the application management table described with reference to FIGS. 5A and 5B. The reference can be performed via, for example, a function provided by the application management framework. In step S7003, it is determined whether there is the newly installed fragment bundle 305. If there is the newly installed fragment bundle 305, the process advances to step S7004. If there is no newly installed fragment bundle 305, the process advances to step S7005. In step S7004, the resource service 304 performs processing when the fragment bundle 305 is installed. Upon completion of the processing when the fragment bundle 305 is installed, the process advances to step S7005.

In step S7005, the resource service 304 determines whether there is the uninstalled fragment bundle 305. If there is the uninstalled fragment bundle 305, the process advances to step S7006. If there is no uninstalled fragment bundle 305, the process advances to step S7007. In step S7006, the resource service 304 performs processing when the fragment bundle 305 is uninstalled. Upon completion of the processing when the fragment bundle 305 is uninstalled, the process advances to step S7007. If the process reaches step S7007, the activation processing of the resource service 304 is completed.

FIGS. 7B to 7E are flowcharts for further explaining the contents of step S7004 that is the processing when the fragment bundle 305 is installed. In step S7101, a series of processes starts. First, in step S7102, the resource service 304 acquires group information, more specifically, the group ID 431 from the newly installed fragment bundle 305. Then, in step S7103, it is determined whether the acquired group information has been registered in the group data table 600. If the acquired group information has not been registered, the process advances to step S7104. In step S7104, the acquired group information is registered in the group data table 600, and the process advances to step S7106. If the acquired group information has been registered, the process advances to step S7105. In step S7105, data in the group data table 600 is updated using the acquired group information, and the process advances to step S7106. In steps S7104 and S7105, the respective items shown in FIG. 6A are registered or updated. The contents of the fragment bundle ID field 601, group ID field 602, and management target application ID field 605 are acquired from the fragment bundle ID 430, group ID 431, and member application ID 433 of the fragment bundle upper limit declaration file 422. As the detection time, the time of detection is read from a real-time clock, a time site on the Internet, or the like, and recorded. In step S7106, it is checked whether the installed applications 11$n$ include the application 11$n$ belonging to a group indicated by group information held by the installed fragment bundle 305. If there is no such application 11$n$, the process advances to step S7117. If there is the application 11$n$ belonging to the group, the process advances to step S7107 to target these applications.

In steps S7107 to S7113, repetitive processing is executed for the applications 11$n$. In step S7108, the resource service 304 confirms through the application management framework 302 whether the processing target application 11$n$ has been started. If the processing target application 11$n$ has been started, the process advances to step S7109. If the processing target application 11$n$ is in the stop state, the process advances to step S7110. In step S7109, the processing target application 11$n$ is stopped through the application management framework 302. The process then advances to step S7110. In step S7110, the upper limit value of the storage that is described and declared in the manifest of the processing target application 11$n$ is acquired. In step S7111, the current storage use amount of the processing target application is acquired. This value is acquired from, for example, the application execution platform 301 through the application management framework 302. In step S7112, the resource service 304 acquires the size of the program body file of the processing target application 11$n$ through the application management framework 302. The size of the program body file is a total size by which files containing program codes and files expanded at the time of installation and necessary to execute programs occupy the storage when these files are expanded in the image forming apparatus 100. Subsequently, in step S7113, it is determined whether the repetitive processing for the processing target application 11$n$ is completed. If the repetitive processing is not completed, the process is continued from step S7107. If the repetitive processing is completed, the process advances to step S7114.

In step S7114, the total use amount of the data part out of the storage use amount calculated for each processing target application 11$n$ in the repetitive processing starting from step S7107 is calculated. The use amount of the data part is a value obtained by subtracting the size of the program body file acquired in step S7112 from the storage use amount acquired in step S7111. That is, the use amount of the data part equals the use amount of the storage additionally used later at the time of operation, except for the program body file expanded when the application 11$n$ is installed. In step S7114, the total use amount of the data part is calculated for all installed applications belonging to the group. In step S7115, it is checked whether the total value exceeds the upper limit value 432 of the storage of the group declared by the processing target fragment bundle 305. If the total value exceeds the upper limit value 432, the process advances to step S7116. If the total value does not exceed the upper limit value 432, the process advances to step S7119.

In steps S7119 to S7130, repetitive processing is performed again for, as the processing target, the installed application 11$n$ belonging to the group. First, in step S7120, the new application resource upper limit declaration file 402 is generated, in which the resource upper limit value 412 of the application resource upper limit declaration file 402 of the processing target application 11$n$ is rewritten. As for the storage, the new application resource upper limit declaration file 402 declares, as the upper limit value, the size of the program body file of the processing target application 11$n$ that has been acquired in step S7112. As for other resources, the upper limit values are 0. Then, in step S7121, the application resource upper limit declaration file 402 generated in step S7120, and other program body files are combined to create a file for installation. In step S7122, the resource service 304 performs an overwrite install operation through the application management framework 302 by using the file for installation created in step S7121. In step S7123, it is checked whether the overwrite installation has succeeded. If the overwrite installation has succeeded, the process advances to step S7124. If the overwrite installation has failed, the process advances to step S7128. In step S7124, the group management state 626 of the processing target application is changed to be valid in the application data table 620. In step S7125, the storage resource of the data part and other resources that have been used up to now by the processing target application 11$n$ are transferred to under group management. More specifically, management for each application 11$n$ is changed to management for each group indicated by the installed fragment bundle 305. In step S7126, it is determined whether the group management of the installed fragment bundle 305 is invalid in the group data table 600. If the group management of the installed fragment bundle 305 is not invalid, that is, is valid, the process advances to step S7128. If the group management of the installed fragment bundle 305 is invalid, the process advances to step S7127 to change the validation state 606 in the group data table 600 to be valid. Thereafter, the process advances to step S7128. In step S7128, it is determined whether the processing target application 11$n$ is in the stop state. If the processing target application 11$n$ has been started, the process advances to step S7130. If the processing target application 11$n$ is in the stop state, the process advances to step S7129. The resource service 304 starts the processing target application 11$n$ through the application management framework 302. The process then advances to step S7130. In step S7130, it is confirmed whether the repetitive processing for the processing target application 11$n$ is completed. If the repetitive processing is not completed, the process returns to step S7119 to continue the repetitive processing. If the repetitive processing is completed, the process advances to step S7133. If it is determined in step S7106 that none of the applications 11$n$ belonging to the group of the installed fragment bundle 305 has been installed, the process advances to step S7117. In step S7117, the resource service 304 outputs a warning "the application 11$n$ belonging to the group of the installed fragment bundle 305 has not been installed." After that, the process advances to step S7131.

If it is determined in step S7115 that the total use amount of the data part of the storage of the application 11$n$ belonging to the group of the installed fragment bundle 305 exceeds the upper limit of the group, the process advances to step S7116. In step S7116, the resource service 304 outputs a warning "the total use amount of the storage of the application 11$n$ belonging to the group of the installed fragment bundle 305 exceeds the upper limit of the group." The process then advances to step S7131.

In step S7131, it is checked whether the validation state 606 of the group of the installed fragment bundle 305 is invalid. If the validation state 606 is invalid, the process advances to step S7133. If the validation state 606 is valid, the process advances to step S7132 to set the validation state 606 of the group of the installed fragment bundle 305 to be invalid. The process advances to step S7133. In step S7133, it is determined whether there is another installed fragment bundle 305. If there is another installed fragment bundle 305, processing for the fragment bundle 305 is continued from step S7102. If there is no other installed fragment bundle 305, the process advances to step S7134. In step S7134, the series of processes is completed.

FIGS. 7F and 7G are flowcharts for further explaining the contents of step S7006 that is processing when the fragment bundle 305 is uninstalled. In step S7201, a series of processes starts. First, in step S7202, the resource service 304 acquires group information of the uninstalled fragment bundle 305 from the group data table 600. Then, in step S7203, the validation state 606 in the group data table 600 is changed to the uninstall completion state. In step S7204, it is checked whether the installed applications 11$n$ include the application 11$n$ belonging to a group indicated by group information held by the uninstalled fragment bundle 305. If there is installed no such application 11$n$, the process advances to step S7220. If there is installed the application 11$n$ belonging to the group, the process advances to step S7205.

In steps S7205 to S7219, repetitive processing is executed for the application 11$n$ belonging to the group. In step S7206, the application resource upper limit declaration file 402 of the processing target application 11$n$ in which the resource upper limit 412 is rewritten is generated. The value of the resource upper limit 412 rewritten at this time uses a value before rewrite by the resource service 304 at the time of transferring the processing target application 11_n_ to group management. That is, an upper limit value declared when the processing target application 11_n_ operates under single management is used. This value is saved in the application data table 620. In step S7207, a file for installation is generated from the program body file of the processing target application and the application resource upper limit declaration file 402 generated in step S7206. In step S7208, the resource service 304 executes overwrite installation through the application management framework 302 by using the file generated in step S7207. In step S7209, it is checked whether the overwrite installation has succeeded. If the overwrite installation has succeeded, the process advances to step S7210. If the overwrite installation has failed, the process advances to step S7217.

In step S7210, it is checked whether the processing target application 11_n_ has been started. If the processing target application 11_n_ is in the stop state, the process advances to step S7212. If the processing target application 11_n_ has been started, the process advances to step S7211. In step S7211, the processing target application 11_n_ is started. The process then advances to step S7212. In step S7212, resources ensured under group management for the processing target application 11_n_ are transferred to an area ensured under single management of the application 11_n_, and the use amount is totaled again as a use amount in single management. In step S7213, the group management state 626 of the application data table 620 is changed to be invalid. In step S7214, a value obtained by adding the use amount of the storage for data used by the processing target application 11_n_ and the use amount of the program body file is checked. More specifically, it is confirmed whether this value exceeds the upper limit declaration value of the storage in single management of the processing target application 11_n_. If this value exceeds the upper limit declaration value, the process advances to step S7218. If this value falls within the upper limit value, the process advances to step S7215. In step S7215, it is confirmed whether the processing target application is in the stop state. If the processing target application is in the stop state, the process advances to step S7216. In step S7216, the resource service 304 starts the processing target application 11_n_ through the application management framework 302. Thereafter, the process advances to step S7219.

If it is determined in step S7209 that the overwrite installation has failed, the process advances to step S7217. In step S7217, a warning "an error occurs in processing of returning the application 11_n_ under group management to single management." is output. The process advances to step S7219.

If it is determined in step S7214 that the sum exceeds the upper limit value of the storage in single management of the processing target application 11_n_, the process advances to step S7218. In step S7218, the resource service 304 outputs a warning "the application 11_n_ under group management has been returned to single management, but the use amount of the storage exceeds the upper limit, so execution of the application 11_n_ is temporarily stopped." The process advances to step S7219.

In step S7219, it is determined whether the repetitive processing for all the processing target applications 11_n_ is completed. If the unprocessed processing target application 11_n_ remains, the process is continued from step S7205. If the processing for all the processing target applications 11_n_ is completed, the process advances to step S7220. In step S7220, it is checked whether there is another uninstalled fragment bundle 305. If there is another uninstalled fragment bundle 305, the process is continued from step S7202 from the next fragment bundle 305. If there is no other uninstalled fragment bundle 305, the process advances to step S7221. In step S7221, the series of processes is completed.

<Concrete Explanation of Resource Management>

FIG. 8 is a view further schematically showing the method of performing group management of the storage by the resource service 304 according to this embodiment.

A state 800 represents a state in which the fragment bundle 305 is not installed for the resource service 304. At this time, an upper limit value declared by the application ALPHA is a size indicated by an upper limit value 809. Of this, a use amount by which the program body file of the application ALPHA occupies the storage is a size indicated by a use amount 801. A storage amount used to create a file for data when the application ALPHA operates is a size indicated by a use amount 802. The free area is a capacity 803. This also applies to the application BETA. An upper limit value is indicated by an upper limit value 819. An amount by which the program body file occupies the storage is a size indicated by a use amount 811, and an amount used to create a file for data is indicated by a use amount 812. The free area is a capacity 813. This also applies to the application GAMMA. An upper limit value is indicated by an upper limit value 829. An amount by which the program body file occupies the storage is indicated by a use amount 821, a use amount for data is a use amount 822, and the free area is a capacity 823. Note that the capacities 801, 811, and 821 are capacities by which the capacities of the program body files are occupied in a state in which the respective applications 11_n_ are installed. According to the principle of the application management framework 302, these capacities cannot be managed separately from the applications.

A state 890 represents a state in which the fragment bundle 305 is installed. A capacity 899 indicates a storage amount usable for data in the entire group in the state in which the fragment bundle 305 is installed. According to the above-described principle, for example, only the capacity 801 by which the program body file occupies the storage needs to be ensured by the application resource upper limit declaration file 402 for the application ALPHA. Similarly, for the application BETA, a capacity indicated by the capacity 811 needs to be ensured. Also, as for the application GAMMA, the capacity 821 needs to be ensured. In this embodiment, these capacities need to be declared by the application resource upper limit declaration files 402 of these applications and ensured even in the state in which the fragment bundle 305 is installed. For this purpose, processing of rewriting the application resource upper limit declaration files 402 is performed in the course of installing the fragment bundle 305. As a result, the use amounts 801, 811, and 821 of the program body files remain as the use amounts of the resources of the respective applications, as indicated by an arrow 831. To the contrary, the use amounts 802, 812, and 822 of the areas for data ensured in the declared areas of the respective applications in single management are transferred. The use amounts 802, 812, and 822 are managed in a resource area newly ensured for the group in the fragment bundle 305, as indicated by an arrow 832. Therefore, the resource service 304 can continue management so that the sum of these use amounts with respect to the storage does not exceed the size of the area 899 assigned to the fragment bundle 305. When uninstalling the fragment bundle 305, a reverse operation is performed.

<Application Install Procedures>

FIG. 9 is a flowchart schematically showing the sequence of install processing for the application 11*n* according to this embodiment. The resource service 304 executes this sequence upon receiving from the application management framework 302 a notification that the application 11*n* has been installed. The process starts from step S9001. In step S9002, the resource service 304 receives data of the installed application 11*n* from the application management framework 302. In step S9003, the resource service 304 registers the data of the installed application 11*n* in the application data table 620. In step S9004, it is determined a group to which the installed application belongs. If the installed application does not belong to any group, the process advances to step S9017. If the installed application belongs to a group, the process advances to step S9005. In step S9005, it is determined whether information of the group to which the installed application belongs has been registered in the group data table 600. If the information has not been registered, the process advances to step S9017. If the information has been registered, the process advances to step S9006. In step S9006, it is checked whether group information of the group to which the installed application 11*n* belongs is valid in the validation state 606 of the group data table 600. If the group information is invalid, the process advances to step S9017. If the group information is valid, the process advances to step S9008. The determination in steps S9004 to S9007 can be performed by looking up the group data table 600 and the application data table 620. In step S9008, it is determined whether the installed application 11*n* has been started.

If the processing target application 11*n* is in the stop state, the process advances to step S9010. If the installed application 11*n* has been started, the process advances to step S9009. In step S9009, the resource service 304 stops the installed application 11*n* through the application management framework 302. The process then advances to step S9010. In step S9010, the resource service 304 acquires the size of the program body file of the installed application 11*n*. In step S9011, the new application resource upper limit declaration file 402 is generated, in which the resource upper limit value 412 of the application resource upper limit declaration file 402 of the installed application 11*n* is rewritten. As for the storage, the new application resource upper limit declaration file 402 declares, as the upper limit value, the size of the program body file of the application 11*n* to be installed that has been acquired in the previous stage. As for other resources, the upper limit values are 0. That is, if group management is possible, a resource upper limit value for single management is replaced with a resource upper limit value for group management. In step S9012, the application resource upper limit declaration file 402 generated in step S9011 and other program body files are combined to create a file for installation. In step S9013, the resource service 304 performs an overwrite install operation through the application management framework 302 by using the file for installation created in step S9012. In step S9014, it is checked whether the overwrite installation has succeeded. If the overwrite installation has succeeded, the process advances to step S9015. If the overwrite installation has failed, the process advances to step S9109. In step S9015, the group management state 626 in the application data table 620 for the installed application 11*n* is changed to be valid. The process then advances to step S9019.

After the process advances to step S9017, the resource service 304 checks through the application management framework 302 whether the installed application is in the stop state. If the installed application is in the stop state, the process advances to step S9018. If the installed application has been started, the process advances to step S9019. In step S9018, the resource service 304 starts the installed application 11*n* through the application management framework 302. The process advances to step S9019. In step S9019, the series of processes is completed.

By these procedures, when an application subjected to group management is installed and group management is impossible, resources are managed for the single application and the application is executed.

<Application Uninstall Procedures>

FIG. 10 is a flowchart schematically showing the sequence of uninstall processing for the application 11*n* according to this embodiment. The resource service 304 executes this sequence upon receiving from the application management framework 302 a notification that the application 11*n* has been uninstalled. The process starts from step S10001. In step S10002, the resource service 304 receives data of the uninstalled application 11*n*. In step S10003, it is checked whether there is an unreleased resource among resources acquired by the uninstalled application 11*n*. If there is no unreleased resource, the process advances to step S10010. If there is an unreleased resource, the process advances to step S10004.

In step S10004, repetitive processing is executed for the unreleased resource among the resources acquired by the uninstalled application 11*n*. In step S10005, it is checked whether the resource can be released. If the resource can be released, the process advances to step S10006. If the resource cannot be released, the process advances to step S10008. In step S10006, the resource is released. In step S10007, the amount of the released resource is subtracted from a use amount in the management unit. For example, the amount of the released resource is subtracted from the total use amount in the case of single management, and from the use amount of the group in the case of group management. After that, the process advances to step S10009. If the process advances to step S10008, the resource service 304 outputs a warning "release of the resource has failed." The process advances to step S10009. In step S10009, it is determined whether all resources subjected to repetitive processing have been processed. If an unprocessed resource remains, the process returns to step S10004 and is continued. If all resources have been processed, the process advances to step S10010.

In step S10010, it is determined whether the uninstalled application 11*n* belonged to a group. If the uninstalled application 11*n* did not belong to a group, the process advances to step S10013. If the uninstalled application 11*n* belonged to a group, the process advances to step S10011. In step S10011, it is determined whether there is another installed application 11*n* in the group to which the uninstalled application 11*n* belonged. In this determination, for example, the application data table 620 is searched for another application belonging to the same group as that of the uninstalled application, and if there is such an application, the group management state 626 corresponding to this application is referred to. If there is "valid" group management, it can be determined that there is another application belonging to the same group. If there is another application 11*n* belonging to the same group, the process advances to step S10013. If there is no other application 11*n*, the process advances to step S10012. In step S10012, the validation state 606 of the group to which the uninstalled application 11*n* belonged is changed to be invalid. In this step, for example, the validation state 606 of the corresponding group in the group data table 600 is rewritten into "invalid". The process advances to step S10013. In step S10013, information of the uninstalled application 11*n* is erased from the application data table 620. The process advances to step S10014. In step S10014, the series of processes is completed.

As described above, according to the first embodiment of the present invention, by using the resource service 304, the application 11*n* can operate under single management in which resources are exclusively managed for each application. The resource service 304 can control the application 11*n* not to exceed the resource upper limit 412 declared by the application resource upper limit declaration file 402 even when the application 11*n* is under single management. In addition, according to this embodiment, the resource service 304 installs the fragment bundle 305 holding group information and can operate the application 11*n* under group management in which resources are shared between applications belonging to a group. At this time, the resource service 304 can control the application 11*n* not to exceed the upper limit values of resources set for the group when the application 11*n* operates under the group management. In this embodiment, even when the fragment bundle 305 is installed in a state in which the application 11*n* operates, the resource service 304 can continue resource management without any inconsistency. In this case, the application 11*n* can continuously shift from single management to group management. Similarly, when the fragment bundle 305 is uninstalled, the application 11*n* can shift from group management to single management and be used continuously. In this manner, according to this embodiment, two aspects, that is, single management and group management regarding resource management of the application 11*n* can be freely switched and applied.

As a result, according to this embodiment, when introducing a plurality of applications 11*n* in combination, the fragment bundle 305 that holds group information can be used. The upper limit of a resource in the group can be suppressed to be lower than the simple sum of upper limits declared by the respective single applications 11*n*. This yields an effect capable of introducing a combination of applications 11*n* that cannot be introduced when the resource management apparatus according to this embodiment is not provided, because the sum of resource upper limit values exceeds a limitation in the application execution environment. In addition, according to this embodiment, the fragment bundle 305 having group information suffices to be introduced only when group management becomes necessary. This can lower the hurdle of introducing the application 11*n*, and produces an effect of greatly reducing the burden on the administrator who manages the image forming apparatus 100.

When a fragment bundle for a group is not installed for an application subjected to group management, or when the fragment bundle is installed but invalid, the application is regarded as an application subjected to single management and its resources are managed.

Second Embodiment

The second embodiment according to the present invention will be described with reference to the accompanying drawings. In the first embodiment, a value at the time of operation under single management needs to be described in the resource upper limit value 412 of the application resource upper limit declaration file 402 in order to operate the application 11*n* even in the single management state. However, when the premise is operation in the group management state, the declaration of such a value is unnecessary. The second embodiment will describe a resource management apparatus that easily performs resource management of an application 11*n* based on group management by shifting, to the stop state, the application 11*n* not properly set in the group management state.

The arrangement of the apparatus according to the second embodiment of the present invention is the same as that shown in FIG. 1. The hardware arrangement of an image forming apparatus 100 according to the second embodiment is the same as that shown in FIG. 2. The arrangement of an application execution environment for executing the application 11*n* according to the second embodiment is the same as that shown in FIG. 3. The contents of files constituting the application 11*n* in the second embodiment, and the contents of files constituting a fragment bundle 305 are the same as those shown in FIG. 4B.

FIGS. 11A and 11B show examples of the screen (user interface) of an application management framework 302 according to this embodiment. Only differences from FIGS. 5A and 5B will be explained. In this embodiment, when the fragment bundle 305 having group information is not installed, the application 11*n* belonging to a group indicated by the group information is set in the stop state. This is represented by a state field 1100 in FIG. 11A. The state field 1100 represents that an application ALPHA, application BETA, and application GAMMA belonging to the group are set in the stop state. In contrast, when the fragment bundle 305 is installed, as indicated by a line 530, the applications 11*n* shift to the start state, as indicated by a state field 1101 in FIG. 11B.

The contents of a group data table 600 according to this embodiment are the same as those in FIG. 6A. The sequence of processing when a resource service 304 according to this embodiment is activated is the same as that shown in FIG. 7A.

<Fragment Bundle Install Processing According to Second Embodiment>

The contents of step S7004 that is processing when the fragment bundle 305 is installed are shown in the flowchart of FIG. 12A and will be explained. In this embodiment, as for the storage, the file size of a program body is given as a resource upper limit value 412 of an application resource upper limit declaration file 402, and as for other types of resources, 0 is given. More specifically, the application resource upper limit declaration file 402 defines the resource upper limit value of each application under group management according to the first embodiment.

In step S12101, a series of processes starts. In step S12102, the resource service 304 acquires group information from the installed fragment bundle 305. In step S12103, it is determined whether the acquired group information has been registered in a group data table 600. If the acquired group information has not been registered, the process advances to step S12104. In step S12104, the acquired group information is registered in the group data table 600, and the process advances to step S12106. If the acquired group information has been registered, the process advances to step S12105. In step S12105, data in the group data table 600 is updated using the acquired group information, and the process advances to step S12106. In step S12106, it is checked whether the installed applications 11*n* include the application 11*n* belonging to a group held by the installed fragment bundle 305. If there is no such application 11*n*, the process advances to step S12113. If there is the application 11*n* belonging to the group, the process advances to step S12107.

In steps S12107 to S12110, repetitive processing is performed for the applications 11*n* belonging to the group. In step S12108, it is determined whether the processing target application 11*n* is in the stop state. If the processing target application 11*n* is not in the stop state, the process advances to step S12109. If the processing target application 11*n* is in the stop state, the process advances to step S12110. In step S12109, the resource service 304 starts the processing target application 11*n* through the application management framework 302, and the process advances to step S12110. In step S12110, it is determined whether there is another processing target application 11*n*. If there is another processing target application 11*n*, the repetitive processing from step S12107 is continued. If there is no other processing target application 11*n*, the process advances to step S12112. In step S12109, group management is validated for the group held by the installed fragment bundle 305, and the process advances to step S12114. If the process advances from step S12106 to step S12113, the resource service 304 outputs a warning "an application belonging to the group has not been installed." Upon completion of the processing in step S12113, the process also advances to step S12114. In step S12114, the resource service checks whether there is another installed fragment bundle 305. If there is another installed fragment bundle 305, the process returns to step S12102 to execute the same processing for the fragment bundle 305. If there is no other fragment bundle 305, the process advances to step S12115 to end the series of processes.

<Fragment Bundle Uninstall Processing According to Second Embodiment>

The contents of step S7006 that is processing when the fragment bundle 305 is uninstalled will be explained with reference to FIGS. 12B and 12C. In step S12201, a series of processes starts. In step S12202, the resource service 304 acquires group information of the uninstalled fragment bundle 305 by referring to the group data table 600. In step S12203, deletion detection time 604 is updated in regard to the group in the group data table 600, and a validation state 606 is updated to be "uninstalled". In step S12204, it is checked whether the installed applications 11*n* include the application 11*n* that belonged to the group indicated by the group information held by the uninstalled fragment bundle 305. If there is no such application 11*n*, the process advances to step S12216. If there is the application 11*n* that belonged to the group, the process advances to step S12205. In steps S12205 to S12215, repetitive processing is performed for the target applications 11*n*. In step S12206, it is determined whether the processing target application 11*n* has been started. If the processing target application 11*n* has not been started but is in the stop state, the process advances to step S12208. If the processing target application 11*n* has been started, the process advances to step S12207. In step S12207, the resource service 304 stops the processing target application 11*n* through the application management framework 302. The process then advances to step S12208. In step S12208, the resource service 304 determines whether there is an unreleased resource among resources acquired by the processing target application 11*n*. If there is an unreleased resource, the process advances to step S12209. If there is no unreleased resource, the process advances to step S12215.

In steps S12209 to S12214, repetitive processing is executed for the unreleased resource. In step S12210, it is checked whether the processing target unreleased resource can be released. If the resource can be released, the process advances to step S12211. In step S12211, processing of actually releasing the resource is performed, and the process advances to step S12212. In step S12212, the use amount of the released resource is subtracted from the use amount of the resource managed as a whole. The process then advances to step S12214. If the resource cannot be released, the process advances to step S12213. In step S12213, a warning "release of the resource has failed." is output, and the process advances to step S12214. In step S12214, it is determined whether a processing target resource still exists. If a processing target resource exists, the process returns to step S12209 to continue the repetitive processing. If no processing target resource exists, the process advances to step S12215. In step S12215, it is determined whether the processing target application 11*n* still exists. If the processing target application 11*n* exists, the process returns to step S12205 to continue the repetitive processing. If the processing target application 11*n* does not exist, the process advances to step S12216.

In step S12216, it is checked whether there is another uninstalled fragment bundle 305. If there is another uninstalled fragment bundle 305, the fragment bundle 305 is set as the processing target and the process is continued from step S12202. If there is no other uninstalled fragment bundle 305, the process advances to step S12217 to end the series of processes.

<Operation of Resource Service when Application is Installed>

FIG. 13 is a flowchart schematically showing the operation of the resource service 304 when the application 11*n* is installed according to this embodiment. The process starts from step S13001. In step S13002, the resource service 304 receives from the application management framework 302 a notification that the application 11*n* has been installed. In step S13003, the resource service 304 checks whether the installed application 11*n* is a target of group management. If the application 11*n* does not belong to group management, the process advances to step S13013. If the application 11*n* belongs to group management, the process advances to step S13004. In step S13004, it is checked whether group information of the group to which the installed application 11*n* belongs exists in the group data table 600. If the group information does not exist, the process advances to step S13010. If the group information exists, the process advances to step S13005. In step S13005, it is checked whether group management of the group has not been deleted and remains installed. In this determination, if there is the entry of the target group in the group data table 600, it can be determined that the group management remains installed. If the group management remains installed, the process advances to step S13006. If the group management has been uninstalled, the process advances to step S13010. In step S13006, it is checked whether group management of the group is valid. If the group management is valid in the group data table 600, the process advances to step S13008. If the group management is invalid, the process advances to step S13007. In step S13007, the group management of the group is validated. Upon completion of the validation, the process advances to step S13008. In step S13008, it is confirmed whether the installed application is in the stop state. If the installed application is in the stop state, the process advances to step S13009. If the installed application has been started, the process advances to step S13013. In step S13009, the resource service 304 starts the installed application 11*n*, and the process advances to step S13013.

If the process advances from step S13004 or S13005 to step S13010, a warning "group information has not been installed." is output. This is a case in which group information corresponding to the installed application 11*n* has not been installed. In this case, after outputting the warning, it is checked in step S13011 whether the installed application has been started. If the installed application has been started, the process advances to step S13012. If the installed application has not been started and is in the stop state, the process advances to step S13013. In step S13012, the resource service 304 stops the installed application 11*n* through the application management framework 302. In step S13013, the series of processes is completed.

<Operation of Resource Service when Application is Uninstalled>

Figure 14:
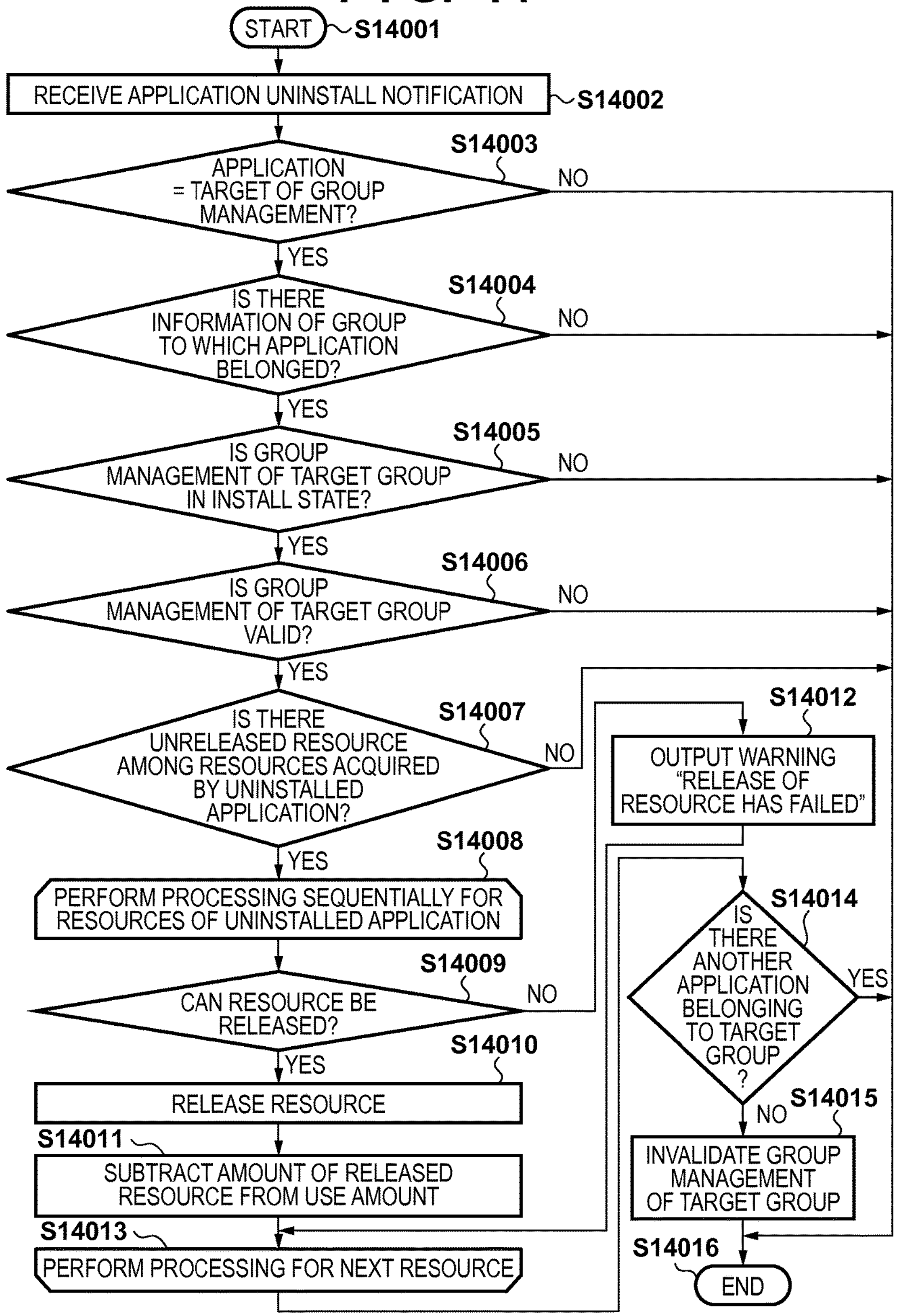
FIG. 14 is a flowchart showing uninstall processing for an application according to the second embodiment of the present invention.

FIG. 14 is a flowchart schematically showing the operation of the resource service 304 when the application 11*n* is uninstalled according to this embodiment. The process starts from step S14001. In step S14002, the resource service 304 receives from the application management framework 302 a notification that the application 11*n* has been uninstalled. In step S14003, it is checked whether the uninstalled application 11*n* was a target of group management. If the application 11*n* was not a target of group management, the process advances to step S14016. If the application 11*n* was a target of group management, the process advances to step S14004. In step S14004, it is checked whether information of the group to which the uninstalled application 11*n* belongs existed in the group data table 600. If the information existed, the process advances to step S14005. If the information did not exist, the process advances to step S14015.

In step S14005, it is checked whether group management of the group to which the uninstalled application 11*n* belongs remains installed. If the group management has been uninstalled, the process advances to step S14016. If the group management remains installed, the process advances to step S14006. In step S14006, it is checked whether group management of the group to which the uninstalled application 11*n* belongs is valid. If the group management is invalid, the process advances to step S14016. If the group management is valid, the process advances to step S14007. In step S14007, it is checked whether there is an unreleased resource among resources acquired by the uninstalled application 11*n*. If there is an unreleased resource, the process advances to step S14008. If there is no unreleased resource, the process advances to step S14016. In step S14008, repetitive processing is performed for the unreleased resource that has been acquired by the uninstalled application 11*n*. In step S14009, it is checked whether the processing target resource can be released. If the resource can be released, the process advances to step S14010. In step S14010, the processing target resource is released. After that, the process advances to step S14011 to subtract the amount of the released resource from the total use amount. The process advances to step S14013. In step S14012, the resource service 304 outputs a warning "release of the resource has failed." The process advances to step S14013. In step S14013, it is determined whether the processing has ended for all processing target resources. If the processing has not ended, the repetitive processing is continued from step S14008. If the processing has ended, the process advances to step S14014.

In step S14014, it is determined for the group to which the uninstalled application 11*n* belonged, whether another application 11*n* belonging to the group exists in the install state. If another application 11*n* exists, the process advances to step S14016. If no other application 11*n* exists, the process advances to step S14015. In step S14015, group management of the group is invalidated in the group data table 600, and the process advances to step S14016. After the process advances to step S14016, the series of processes is completed.

As described above, according to the second embodiment of the present invention, by using the resource service 304, the application 11*n* subjected to group management can always operate under group management.

As a result, according to this embodiment, when introducing a plurality of applications 11*n* in combination, the fragment bundle 305 that holds group information can be used. This yields an effect capable of introducing, as a group, the applications 11*n*, which cannot be singly introduced conventionally because resources are insufficient.

Unlike the first embodiment, an application subjected to group management is not executed under single management. Thus, the processing procedures become simple, and efficient use of resources can be further promoted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-177432, filed Sep. 1, 2014 which is hereby incorporated by reference herein in its entirety.

What is claimed is:

1. An image forming apparatus comprising:

one or more processors; and a memory coupled to the one or more processors and having stored thereon instructions, which, when executed by the one or more processors, cause the image forming apparatus to:

acquire information that defines an identifier of an application belonging to an application set and a use resource amount declared for the application set;

specify an application set to which an application belongs, based on an identifier of the application in response to a call of a resource acquisition API from the application, and specify a use resource amount declared for the specified application set from the information;

when a value obtained by adding a resource amount requested by the application to a total resource amount used by the application set exceeds the specified use resource amount, not transfer a resource object to the application, and when the value does not exceed the use resource amount declared, transfer the resource object to the application; and determine that the application which calls the resource acquisition API belongs to the application set and the application is a target of group management to which a resource is assigned from resources shared in the application set, wherein when the application is not a target of the group management, a use resource amount declared for the application is specified from the information, wherein when the application is not a target of the group management and the application exceeds the specified use resource amount as a result of adding the resource amount requested by the application to the total resource amount used by the application, the resource object is not transferred to the application, and when the application does not exceed the use resource amount declared, the resource object is transferred to the application, and wherein the group management is started by adding the information that defines the identifier of the application belonging to the application set and the use resource amount declared for the application set, and is stopped by deleting the information.

2. The apparatus according to claim 1, wherein when the application is a target of the group management, a use resource amount declared for the application set is specified from the information, and when the application is a target of the group management and the application exceeds the specified use resource amount as a result of adding the resource amount requested by the application to the total resource amount used by the application set, the resource object is not transferred to the application, and when the application does not exceed the use resource amount declared, the resource object is transferred to the application.

3. The apparatus according to claim 1, wherein the instructions, when executed by the one or more processors, further cause the image forming apparatus to, when starting the group management of an application that belongs to the application set and is not a target of the group management, release a resource assigned to the application, and ensure a resource of the use resource amount declared for the application set to which the application belongs.

4. The apparatus according to claim 3, wherein the instructions, when executed by the one or more processors, further cause the image forming apparatus to, when stopping the group management of an application serving as a target of the group management, release a resource assigned to the application set, and ensure a resource of the use resource amount declared for the application.

5. The apparatus according to claim 1, wherein the instructions, when executed by the one or more processors, further cause the image forming apparatus to, when an application is installed, determine whether the application is a target of the group management, and when the application is a target of the group management, release a resource assigned to the application, and ensure a resource of the use resource amount declared for the application set to which the application belongs.

6. The apparatus according to claim 1, wherein when an application is uninstalled, whether the application is a target of the group management is determined, and when the application is a target of the group management, whether an application belonging to the application set has been installed is determined, and when an application belonging to the application set has not been installed, a resource assigned to the application set is released, and the group management to the application set is stopped.

7. The apparatus according to claim 1, wherein the instructions, when executed by the one or more processors, further cause the image forming apparatus to determine that the application which calls the resource acquisition API belongs to the application set and the application is a target of the group management to which a resource is assigned from resources shared in the application set, wherein when stopping the group management of an application serving as a target of the group management, a resource assigned to the application is released, and the application is stopped.

8. The apparatus according to claim 7, wherein when an application is uninstalled, whether the application is a target of the group management is determined, and when the application is a target of the group management, whether an application belonging to the application set has been installed is determined, and when an application belonging to the application set has not been installed, a resource assigned to the application set is released, and the group management to the application set is stopped.

9. A resource management method comprising:

acquiring information that defines an identifier of an application belonging to an application set and a use resource amount declared for the application set;

specifying an application set to which an application belongs, based on an identifier of the application in response to a call of a resource acquisition API from the application, and specifying a use resource amount declared for the specified application set from the information;

when a value obtained by adding a resource amount requested by the application to a total resource amount used by the application set exceeds the specified use resource amount, not transferring a resource object to the application, and when the value does not exceed the use resource amount declared, transferring the resource object to the application; and determining that the application which calls the resource acquisition API belongs to the application set and that the application is a target of group management to which a resource is assigned from resources shared in the application set, wherein when the application is not a target of the group management, a use resource amount declared for the application is specified from the information, wherein when the application is not a target of the group management and the application exceeds the specified use resource amount as a result of adding the resource amount requested by the application to the total resource amount used by the application, the resource object is not transferred to the application, and when the application does not exceed the use resource amount declared, the resource object is transferred to the application, and wherein the group management is started by adding the information that defines the identifier of the application belonging to the application set and the use resource amount declared for the application set, and is stopped by deleting the information.

10. A non-transitory computer-readable medium storing a program thereon for causing a computer to execute a process, the process comprising:

acquiring information that defines an identifier of an application belonging to an application set and a use resource amount declared for the application set;

specifying an application set to which an application belongs, based on an identifier of the application in response to a call of a resource acquisition API from the application, and specifying a use resource amount declared for the specified application set from the information;

when a value obtained by adding a resource amount requested by the application to a total resource amount used by the application set exceeds the specified use resource amount, not transferring a resource object to the application, and when the value does not exceed the use resource amount declared, transferring the resource object to the application; and determining that the application which calls the resource acquisition API belongs to the application set and that the application is a target of group management to which a resource is assigned from resources shared in the application set, wherein when the application is not a target of the group management, a use resource amount declared for the application is specified from the information, wherein when the application is not a target of the group management and the application exceeds the specified use resource amount as a result of adding the resource amount requested by the application to the total resource amount used by the application, the resource object is not transferred to the application, and when the application does not exceed the use resource amount declared, the resource object is transferred to the application, and wherein the group management is started by adding the information that defines the identifier of the application belonging to the application set and the use resource amount declared for the application set, and is stopped by deleting the information.

* * * * *